(12) United States Patent
Wu et al.

(10) Patent No.: US 11,800,581 B2
(45) Date of Patent: Oct. 24, 2023

(54) TECHNIQUES FOR SIDELINK ASSISTED DEVICE ASSOCIATION

(71) Applicant: QUALCOMM Incorporated, San Diego, CA (US)

(72) Inventors: Shuanshuan Wu, San Diego, CA (US); Hong Cheng, Basking Ridge, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/192,839

(22) Filed: Mar. 4, 2021

(65) Prior Publication Data
US 2022/0287113 A1    Sep. 8, 2022

(51) Int. Cl.
*H04W 8/00* (2009.01)
*H04W 8/24* (2009.01)
(Continued)

(52) U.S. Cl.
CPC .......... *H04W 76/14* (2018.02); *H04W 8/005* (2013.01); *H04W 8/24* (2013.01); *H04W 4/40* (2018.02); *H04W 92/18* (2013.01)

(58) Field of Classification Search
CPC ..... H04W 88/04; H04W 92/18; H04W 76/14; H04W 56/001; H04W 48/10;
(Continued)

(56) References Cited

U.S. PATENT DOCUMENTS

2013/0324114 A1\* 12/2013 Raghothaman ....... H04W 76/14
455/426.1
2015/0111560 A1    4/2015 Rogitz
(Continued)

FOREIGN PATENT DOCUMENTS

EP    3133842 B1    7/2019
EP    3644634 A1    4/2020
(Continued)

OTHER PUBLICATIONS

Massimo C., et al., "5G V2X System-Level Architecture of 5GCAR Project", Future Internet, vol. 11, No. 10, Oct. 19, 2019 (Oct. 19, 2019), XP055859654, 26 Pages, DOI: 10.3390/fi11100217 p. 1-p. 26.

(Continued)

*Primary Examiner* — Awet Haile
(74) *Attorney, Agent, or Firm* — Dalei Dong; Holland & Hart LLP

(57) ABSTRACT

Methods, systems, and devices for wireless communications are described. A cellular user equipment (C-UE) and vehicle UE (V-UE) may perform a discovery process. The C-UE and the V-UE may exchange identification and location information. One of the UEs may communicate the identification information of one or both of the UEs to a base station or a sidelink wireless device. The base station and the sidelink wireless device may be co-located. Based on the identification information of the C-UE and the V-UE, the base station may determine that the C-UE and the V-UE are co-located, and the base station may perform downlink transmissions based on the determined co-location.

23 Claims, 15 Drawing Sheets

(51) Int. Cl.
*H04W 76/14* (2018.01)
*H04W 4/40* (2018.01)
*H04W 92/18* (2009.01)

(58) Field of Classification Search
CPC ... H04W 84/047; H04W 76/11; H04W 40/22; H04W 36/30; H04W 40/02; H04W 40/20; H04W 40/246; H04W 72/005; H04W 72/048; H04W 92/10; H04L 1/0026; H04L 5/0035
See application file for complete search history.

(56) References Cited

U.S. PATENT DOCUMENTS

| | | | |
|---|---|---|---|
| 2016/0014589 A1* | 1/2016 | Niu | H04W 76/23 370/329 |
| 2017/0134080 A1* | 5/2017 | Rahman | H04W 72/042 |
| 2018/0035255 A1 | 2/2018 | Kordybach et al. | |
| 2018/0070281 A1* | 3/2018 | Wu | H04W 36/0005 |
| 2018/0295534 A1* | 10/2018 | Huang | H04W 76/15 |
| 2019/0021040 A1 | 1/2019 | Chae et al. | |
| 2019/0028862 A1 | 1/2019 | Futaki | |
| 2019/0116475 A1 | 4/2019 | Lee et al. | |
| 2019/0223231 A1* | 7/2019 | Muraoka | H04W 76/14 |
| 2019/0327618 A1* | 10/2019 | Li | H04W 4/40 |
| 2019/0360823 A1 | 11/2019 | Nelson et al. | |
| 2020/0107172 A1 | 4/2020 | Bharadwaj et al. | |
| 2020/0120458 A1 | 4/2020 | Aldana et al. | |
| 2020/0146094 A1 | 5/2020 | Wu et al. | |
| 2020/0154501 A1 | 5/2020 | Cheng et al. | |
| 2020/0288535 A1* | 9/2020 | Sharma | H04W 36/0033 |
| 2021/0153270 A1* | 5/2021 | Wang | H04W 76/11 |
| 2021/0185685 A1* | 6/2021 | Ryu | H04W 72/02 |
| 2021/0250910 A1* | 8/2021 | Park | H04W 72/0446 |
| 2021/0273714 A1 | 9/2021 | Lee | |
| 2021/0282098 A1* | 9/2021 | Luo | H04W 72/0473 |
| 2021/0357940 A1 | 11/2021 | Benkreira et al. | |
| 2022/0070844 A1* | 3/2022 | Lee | H04W 92/18 |
| 2022/0229146 A1* | 7/2022 | Ko | G01S 5/0072 |
| 2022/0256357 A1 | 8/2022 | Kim et al. | |
| 2022/0286827 A1 | 9/2022 | Cheng et al. | |
| 2022/0287001 A1 | 9/2022 | Wu et al. | |

FOREIGN PATENT DOCUMENTS

| | | |
|---|---|---|
| EP | 3687195 A1 | 7/2020 |
| JP | 2019212954 A | 12/2019 |
| WO | WO-2017134578 A1 | 8/2017 |

OTHER PUBLICATIONS

International Search Report and Written Opinion—PCT/US2022/015206—ISA/EPO—dated Jul. 14, 2022.

* cited by examiner

TECHNIQUES FOR SIDELINK ASSISTED DEVICE ASSOCIATION

FIELD OF DISCLOSURE

The present disclosure, for example, related to wireless communications systems, more particularly to techniques for sidelink assisted device association.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some types of UEs may be cellular UEs (C-UEs) and some types of UEs may be vehicle UEs (V-UEs). In some cases, a C-UE and a V-UE may be co-located. For example, a C-UE may be located near a V-UE, and may travel and move along with the V-UE. Further, base stations may be co-located with road-side units (RSUs). The RSUs may be sidelink communications devices. A base station communicating using a Uu communications link may communicate with a C-UE, and a RSU communicating over a sidelink channel may communicate with other sidelink devices, including V-UEs.

SUMMARY

The described techniques relate to improved methods, systems, devices, and apparatuses that support techniques for sidelink assisted device association. Generally, the described techniques provide for a cellular user equipment (C-UE) and vehicle UE (V-UE) performing a discovery process and exchanging identification and location information. One of the UEs may communicate the identification information of one or both of the UEs to a base station or a sidelink wireless device. The base station and the sidelink wireless device may be co-located. Based on the identification information of the C-UE and the V-UE, the base station may determine that the C-UE and the V-UE are co-located, and the base station may perform downlink transmissions based on the determined co-location.

A method for wireless communications at a first UE is described. The method may include communicating a discovery query message or a discovery request message with a second UE via a sidelink communications link between the first UE and the second UE, communicating identification information with the second UE based on communicating the discovery query message or the discovery request message, and receiving downlink signaling from a base station according to an association between the first UE and the second UE based on the identification information.

An apparatus for wireless communications at a first UE is described. The apparatus may include a processor, memory coupled with the processor, and instructions stored in the memory. The instructions may be executable by the processor to cause the apparatus to communicate a discovery query message or a discovery request message with a second UE via a sidelink communications link between the first UE and the second UE, communicate identification information with the second UE based on communicating the discovery query message or the discovery request message, and receive downlink signaling from a base station according to an association between the first UE and the second UE based on the identification information.

Another apparatus for wireless communications at a first UE is described. The apparatus may include means for communicating a discovery query message or a discovery request message with a second UE via a sidelink communications link between the first UE and the second UE, means for communicating identification information with the second UE based on communicating the discovery query message or the discovery request message, and means for receiving downlink signaling from a base station according to an association between the first UE and the second UE based on the identification information.

A non-transitory computer-readable medium storing code for wireless communications at a first UE is described. The code may include instructions executable by a processor to communicate a discovery query message or a discovery request message with a second UE via a sidelink communications link between the first UE and the second UE, communicate identification information with the second UE based on communicating the discovery query message or the discovery request message, and receive downlink signaling from a base station according to an association between the first UE and the second UE based on the identification information.

In some examples of the method, apparatuses, and non-transitory computer-readable medium described herein, communicating the identification information may include operations, features, means, or instructions for transmitting the identification information of the first UE, the second UE, or a combination thereof, to the base station in an uplink channel transmission, where the uplink channel transmission includes a radio resource control message, an application layer message, or a medium access control channel control element message.

In some examples of the method, apparatuses, and non-transitory computer-readable medium described herein, communicating the identification information may include operations, features, means, or instructions for transmitting the identification information of the UE, the second UE, or a combination thereof, to a sidelink wireless device in a sidelink channel transmission.

In some examples of the method, apparatuses, and non-transitory computer-readable medium described herein, the sidelink wireless device and the base station may be co-located.

Some examples of the method, apparatuses, and non-transitory computer-readable medium described herein may further include operations, features, means, or instructions for transmitting the discovery query message to the second UE and receiving a discovery response from the second UE based at least in part in the discovery query message, where the discovery response includes identification information of the second UE.

Some examples of the method, apparatuses, and non-transitory computer-readable medium described herein may further include operations, features, means, or instructions for establishing a PC5 connection with the second UE and receiving the identification information of the second UE from the second UE.

Some examples of the method, apparatuses, and non-transitory computer-readable medium described herein may further include operations, features, means, or instructions for transmitting a request for identification information of the second UE to the second UE and receiving identification information of the second UE from the second UE.

Some examples of the method, apparatuses, and non-transitory computer-readable medium described herein may further include operations, features, means, or instructions for receiving the discovery request message from the second UE, the discovery request message including identification information of the second UE.

In some examples of the method, apparatuses, and non-transitory computer-readable medium described herein, the identification information of the second UE includes one or more of an application layer identifier, a layer 2 identifier, or a source identifier, or a combination thereof of the second UE, and the identification information corresponds to one or more of vehicle-to-everything communications, sidelink communications, or PC5 communications.

In some examples of the method, apparatuses, and non-transitory computer-readable medium described herein, the identification information of the first UE includes a RNTI of the first UE, a cell identifier of a cell associated with the first UE, or a combination thereof.

In some examples of the method, apparatuses, and non-transitory computer-readable medium described herein, the first UE may be one of a cellular UE or a vehicle UE and the second UE may be the other of the cellular UE or the vehicle UE.

In some examples of the method, apparatuses, and non-transitory computer-readable medium described herein, communicating the identification information may include operations, features, means, or instructions for transmitting the identification information of the first UE, the second UE, or one or more additional UEs, or a combination thereof, to the base station in an uplink channel transmission, where the one or more additional UEs include cellular UEs.

Some examples of the method, apparatuses, and non-transitory computer-readable medium described herein may further include operations, features, means, or instructions for determining that the first UE and the second UE may be co-located based on the first UE and the second UE sharing a location or a trajectory or a combination thereof and transmitting the identification information of the first UE, the second UE, or the one or more additional UEs, or a combination thereof, to the base station based on the determining.

Some examples of the method, apparatuses, and non-transitory computer-readable medium described herein may further include operations, features, means, or instructions for transmitting an indication of a positioning accuracy level corresponding to identification information of the first UE.

A method for wireless communications at a base station is described. The method may include receiving identification information of a first UE in sidelink communication with a second UE, determining identification information of the second UE in communication with the base station, determining that the first UE and the second UE are co-located based on the identification information of the first UE and the identification information of the second UE, and transmitting a downlink message to the second UE based on determining that the first UE and the second UE are co-located.

An apparatus for wireless communications at a base station is described. The apparatus may include a processor, memory coupled with the processor, and instructions stored in the memory. The instructions may be executable by the processor to cause the apparatus to receive identification information of a first UE in sidelink communication with a second UE, determine identification information of the second UE in communication with the base station, determine that the first UE and the second UE are co-located based on the identification information of the first UE and the identification information of the second UE, and transmit a downlink message to the second UE based on determining that the first UE and the second UE are co-located.

Another apparatus for wireless communications at a base station is described. The apparatus may include means for receiving identification information of a first UE in sidelink communication with a second UE, means for determining identification information of the second UE in communication with the base station, means for determining that the first UE and the second UE are co-located based on the identification information of the first UE and the identification information of the second UE, and means for transmitting a downlink message to the second UE based on determining that the first UE and the second UE are co-located.

A non-transitory computer-readable medium storing code for wireless communications at a base station is described. The code may include instructions executable by a processor to receive identification information of a first UE in sidelink communication with a second UE, determine identification information of the second UE in communication with the base station, determine that the first UE and the second UE are co-located based on the identification information of the first UE and the identification information of the second UE, and transmit a downlink message to the second UE based on determining that the first UE and the second UE are co-located.

Some examples of the method, apparatuses, and non-transitory computer-readable medium described herein may further include operations, features, means, or instructions for receiving the identification information of the first UE and the second UE from a sidelink wireless device.

In some examples of the method, apparatuses, and non-transitory computer-readable medium described herein, the sidelink wireless device and the base station may be co-located.

Some examples of the method, apparatuses, and non-transitory computer-readable medium described herein may further include operations, features, means, or instructions for receiving the identification information of the first UE from the second UE in an uplink channel transmission via a Uu communications link between the second UE and the base station.

In some examples of the method, apparatuses, and non-transitory computer-readable medium described herein, the uplink channel transmission includes a radio resource control (RRC) message, an application layer message, or a medium access control channel control element message.

Some examples of the method, apparatuses, and non-transitory computer-readable medium described herein may further include operations, features, means, or instructions for receiving the identification information of the second UE from the second UE in an uplink channel transmission via a Uu communications link between the second UE and the base station.

Some examples of the method, apparatuses, and non-transitory computer-readable medium described herein may further include operations, features, means, or instructions for receiving an indication of a positioning accuracy level corresponding to identification information of the first UE.

Some examples of the method, apparatuses, and non-transitory computer-readable medium described herein may further include operations, features, means, or instructions for determining a beam width of a downlink beam corresponding to the downlink message based on the positioning accuracy level.

Some examples of the method, apparatuses, and non-transitory computer-readable medium described herein may further include operations, features, means, or instructions for transmitting the downlink message to the first UE based on geographic information of the second UE corresponding to the identification information of the second UE.

In some examples of the method, apparatuses, and non-transitory computer-readable medium described herein, the geographic information includes one or more of location information, speed information, path information, trajectory information, or a combination thereof, of the second UE.

Some examples of the method, apparatuses, and non-transitory computer-readable medium described herein may further include operations, features, means, or instructions for receiving the geographic information of the second UE from a sidelink wireless device co-located with the base station.

In some examples of the method, apparatuses, and non-transitory computer-readable medium described herein, the first UE may be one of a cellular UE or a vehicle UE and the second UE may be the other of the cellular UE or the vehicle UE.

In some examples of the method, apparatuses, and non-transitory computer-readable medium described herein, the identification information of the first UE includes a RNTI of the first UE, a cell identifier of a cell associated with the first UE, or a combination thereof.

In some examples of the method, apparatuses, and non-transitory computer-readable medium described herein, the identification information of the second UE includes one or more of an application layer identifier, a layer 2 identifier, or a source identifier, or a combination thereof of the second UE.

Some examples of the method, apparatuses, and non-transitory computer-readable medium described herein may further include operations, features, means, or instructions for receiving identification information of the second UE and one or more additional UEs from the first UE co-located with the second UE, where the one or more additional UEs include cellular UEs and determining that the one or more additional UEs may be co-located with the second UE based on the identification information of the one or more additional UEs.

DETAILED DESCRIPTION

Figure 1:
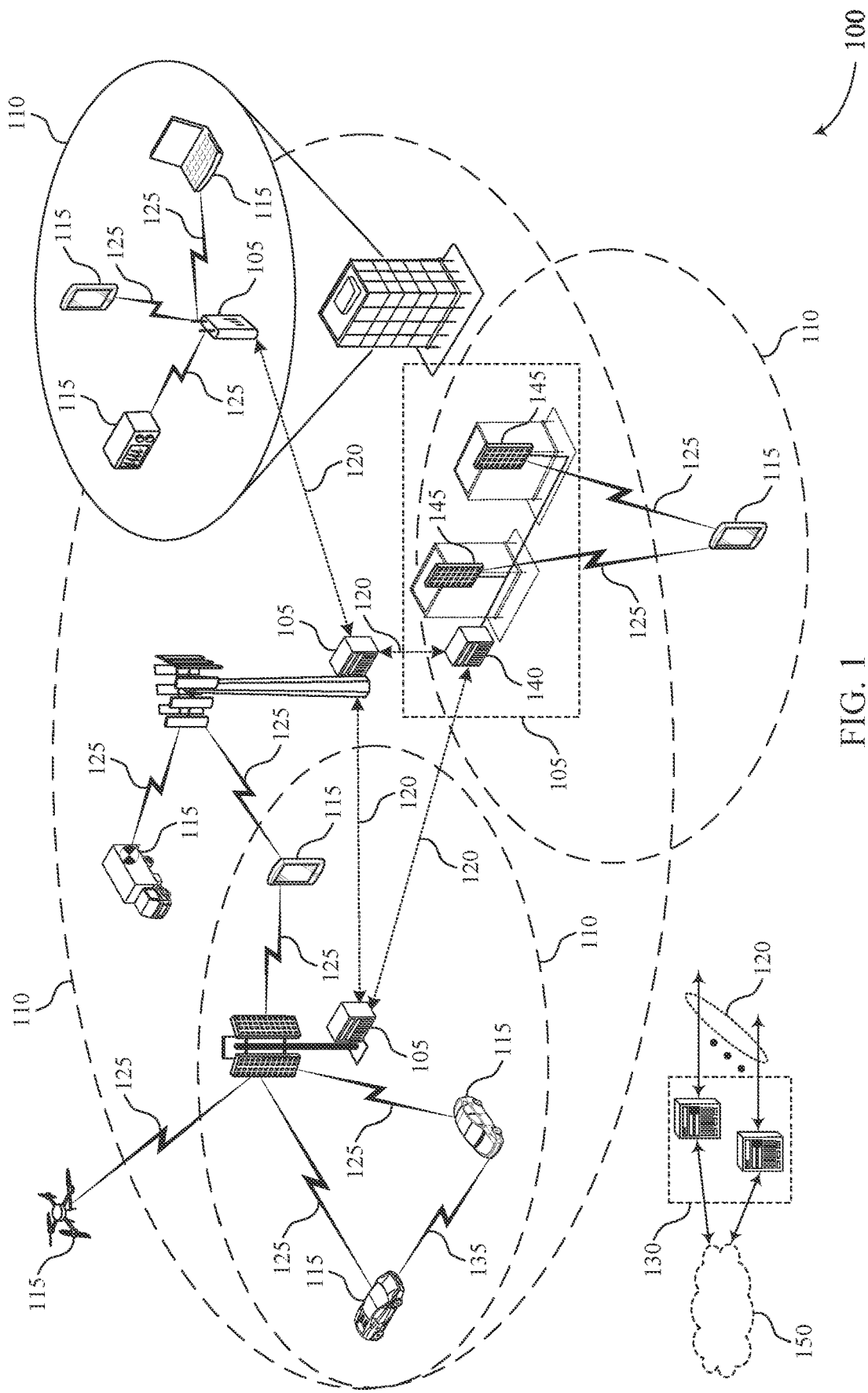
FIG. 1 illustrates an example of a wireless communications system that supports techniques for sidelink assisted device association in accordance with various aspects of the present disclosure.

Wireless communications systems may include different types of communication devices, which may operate according to different procedures. The communication devices may also communicate within different communication channels. Some communication devices may include user equipments (UEs) and base stations. In many cases, UEs and base stations may communicate using a Uu or cellular communications link. In these cases, a UE may transmit uplink communications to a base station, and may receive downlink communications from the base station. A UE that communicates with a base station using a Uu communications link may be an example of a cellular UE (C-UE).

In some cases, UEs and other devices may also communicate using a sidelink communications system. UEs may communicate with other UEs over sidelink channel, by transmitting and receiving sidelink messages. Some UEs may be vehicle UEs (V-UEs), which may be associated with vehicles. V-UEs may communicate with C-UEs over sidelink channels. V-UEs and other UEs may also communicate with other sidelink devices, such as road-side units (RSUs). Sidelink communications may be an example of one radio access technology (RAT), while Uu communications may be an example of a different RAT.

In some cases, RSUs may be co-located with a base station. A base station and RSU may be co-located in cases where the base station and RSU share a housing or enclosure, or if the base station and RSU are physically close to each other (e.g., closer than a threshold value), or when there is an interface that enables communications between the base station and the RSU, or both. The RSU may also communicate directly with the base station. Thus, a RSU may communicate with a V-UE, or a C-UE, or both, and the RSU may communicate information about the devices to the base station. For example, the base station may communicate with a C-UE, but the base station may not be in communication with a V-UE, which may also be in the service area of the base station or near the C-UE. However, the RSU may receive sidelink signaling from the V-UE, and may communicate information about the V-UE to the base station.

In some cases. C-UEs and V-UEs may be co-located. For example, a C-UE may be located within a vehicle associated with a V-UE. In these cases, the C-UE and V-UE may have the same or similar travel speeds, locations, and trajectories. A base station may receive signaling from the C-UE, but not the V-UE, and thus, the base station may not be aware that the C-UE and the V-UE are co-located. However, the RSU may receive sidelink signaling from the V-UE. Based on the signaling, the RSU may determine positioning information, including location, speed, path, and angle of arrival (AoA) information of the V-UE.

The C-UE and V-UE may perform a discovery process to identify each other. The C-UE and the V-UE may then communicate identification information.

For example, the C-UE may transmit the C-UE identification information to the V-UE over a sidelink channel between the V-UE and the C-UE. The V-UE may then communicate the identification information received from the C-UE, and the identification information of the V-UE, to the base station. In some cases, the C-UE or the V-UE may determine that the C-UE and the V-UE are co-located, and the C-UE or the V-UE may transmit an indication of the co-location to the base station, along with the identification information.

In another example, the V-UE may transmit the V-UE identification information to the C-UE over a sidelink channel between the V-UE and the C-UE. The C-UE may then communicate the identification information received from the V-UE, and the identification information of the C-UE, to the base station.

In some cases, the base station may receive identification information of the V-UE from the colocated RSU. The identification information may include location and other positioning information of the V-UE.

Based on receiving the identification information of the V-UE or the C-UE, or both, the base station may determine that the V-UE and the C-UE are co-located. The base station may then perform downlink communication with the C-UE based on the determined co-location. For example, based on receiving identification information (e.g., positioning information) of the V-UE from the RSU, the base station may communicate with the C-UE according to the positioning information of the V-UE, as the C-UE and V-UE are determined to be co-located.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for sidelink assisted device association.

FIG. 1 illustrates an example of a wireless communications system 100 that supports techniques for sidelink assisted device association in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A C-UE 115 and a V-UE maybe co-located, and may perform a discovery process and exchange identification and location information. One of the UEs 115 may communicate the identification information of one or both of the UEs 115 to a base station 105 or a sidelink wireless device. The sidelink wireless device may be an example of a RSU. The base station 105 and the sidelink wireless device may be co-located. Based on the identification information of the C-UE 115 and the V-UE 115, the base station 105 may determine that the C-UE 115 and the V-UE 115 are co-located, and the base station 105 may perform downlink transmissions based on the determined co-location.

Figure 2:
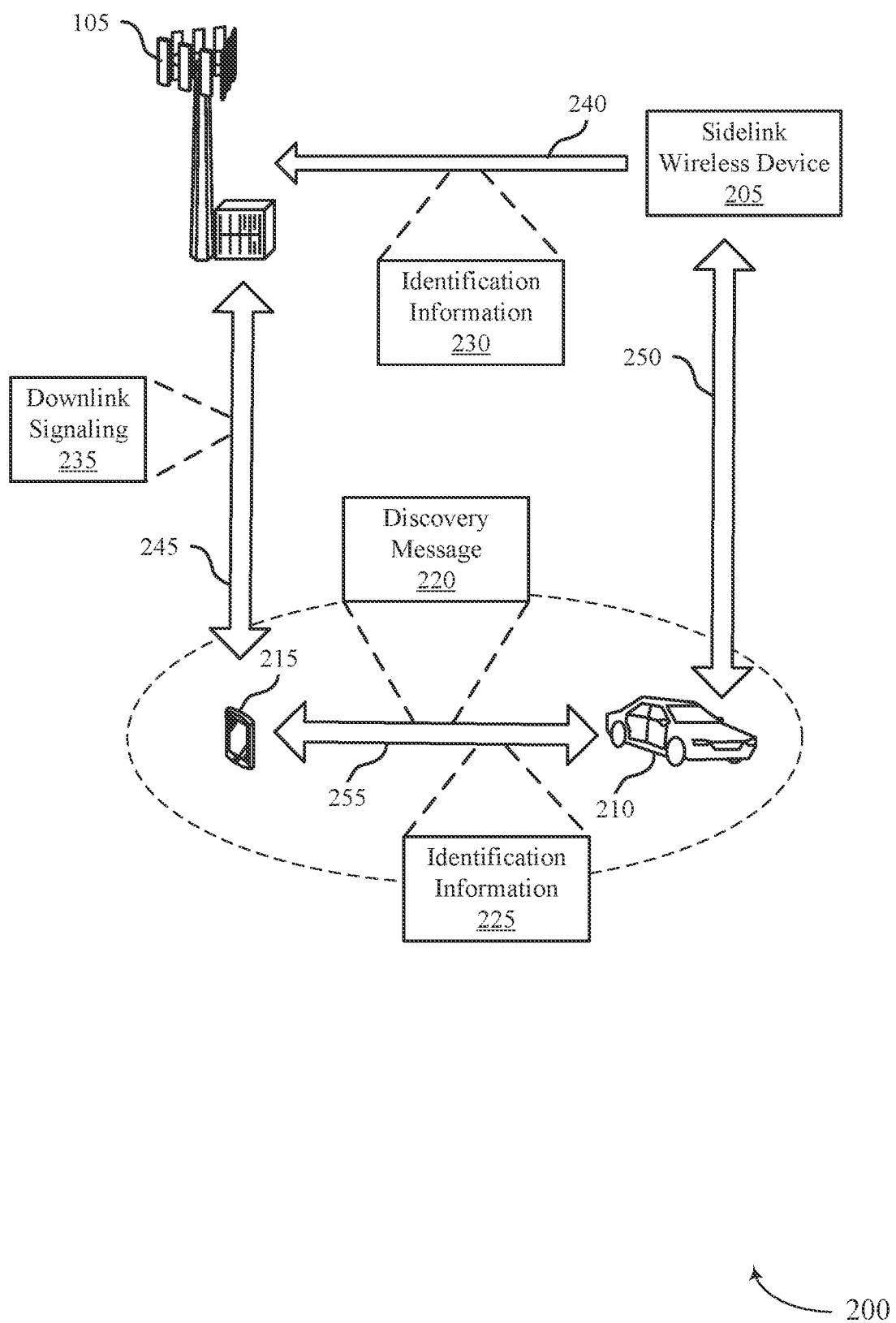
FIG. 2 illustrates an example of a wireless communications system that supports techniques for sidelink assisted device association in accordance with various aspects of the present disclosure.

FIG. 2 illustrates an example of a wireless communication system 200 that supports techniques for sidelink assisted device association in accordance with various aspects of the present disclosure. Wireless communications system 200 also includes C-UE 215, which may be an example of a UE 115 as described with respect to FIG. 1. Wireless communications system 200 also includes a V-UE 210. V-UE 210 and C-UE 215 may be co-located. For example, C-UE 215 may be located within a vehicle corresponding to V-UE 210. Sidelink wireless device 205 may be an example of a RSU. Sidelink wireless device 205 and base station 105 may be co-located.

C-UE 215 may communicate with base station 105 over communications channel 245. Communications channel 245 may be an example of a cellular link or a Uu link. V-UE 210 may communicate with sidelink wireless device 205 over sidelink communications channel 250. V-UE 210 may transmit and receive sidelink communications to and from sidelink wireless device 205. Sidelink wireless device 205 may communicate with base station 105 using communications channel 240. C-UE 215 and V-UE 210 may communicate using sidelink channel 255.

C-UE 215 and V-UE 210 may perform a discovery procedure. C-UE 215 and V-UE 210 may also exchange identification information. C-UE 215 may transmit identification information 225 of C-UE 215 to V-UE 210; V-UE 210 may transmit identification information 225 of V-UE 210 to C-UE 215, or both UEs may transmit identification information 225.

In one example, V-UE 210 may transmit discovery message 220. Discovery message 220 may include a discovery query, which may be used to identify nearby UEs. C-UE 215 may receive discovery message 220, and may respond with a discovery response to V-UE 210. C-UE 215 may transmit a discovery response including identification information 225, which may include identification information of C-UE 215.

In another example, C-UE 215 may transmit discovery message 220. Discovery message 220 may include a discovery query, which may be used to identify nearby UEs. V-UE 210 may receive discovery message 220, and may respond with a discovery response to C-UE 215. V-UE 210 may transmit a discovery response including identification information 225, which may include identification information of V-UE 210.

In another example, C-UE 215 and V-UE 210 may establish a RRC connection, such as a PC5 RRC connection. C-UE 215 may then transmit identification information 225 of C-UE 215. Additionally or alternatively, V-UE 210 may transmit identification information 225 of V-UE 210.

In another example, V-UE 210 may transmit discovery message 220 including a request for identification information of C-UE 215. In this example, C-UE 215 may respond with identification information 225 of C-UE 215.

In another example, C-UE 215 may transmit discovery message 220 including a request for identification information of V-UE 210. In this example, V-UE 210 may respond with identification information 225 of V-UE 210.

In another example, C-UE 215 may transmit discovery message 220, which may be a discovery request. The discovery request in discovery message 220 may indicate the existence of C-UE 215. The discovery request may include the identification information 225 of C-UE 215.

In another example, V-UE 210 may transmit discovery message 220, which may be a discovery request. The discovery request in discovery message 220 may indicate the existence of V-UE 210. The discovery request may include the identification information 225 of V-UE 210.

In another example, V-UE 210 may transmit a discovery message 220, including a request for the identification information of C-UE 215. After receiving discovery message 220 including the request, C-UE 215 may transmit identification information 225 of C-UE 215.

In another example, C-UE 215 may transmit a discovery message 220, including a request for the identification information of V-UE 210. After receiving discovery message 220 including the request, V-UE 210 may transmit identification information 225 of V-UE 210.

In examples where V-UE 210 receives identification information 225 including identification information of C-UE 215, V-UE 210 may transmit identification information to base station 105. V-UE 210 may transmit the identification information of C-UE 215 to base station 105 in an uplink channel message. For example, V-UE 210 may transmit the identification information of C-UE 215 in a RRC message, a MAC-CE message, or an application layer message. In some cases, V-UE 210 may also transmit the identification information of V-UE 210 to the base station 105.

V-UE 210 may transmit the identification information in a sidelink message to sidelink wireless device 205 in sidelink communications channel 250. Sidelink wireless device 205 may receive the identification information from V-UE 210. Sidelink wireless device 205 may send the identification information 230 of C-UE 215 (along with any other C-UEs, not shown) received from V-UE 210. Sidelink wireless device 205 may also transmit the identification information 230 of V-UE 210 in channel 240.

In examples where C-UE 215 receives identification information 225 including identification information of V-UE 210, C-UE 215 may transmit identification information to base station 105. C-UE 215 may transmit the identification information of V-UE 210 to base station 105 in an uplink channel message. For example, C-UE 215 may transmit the identification information of V-UE 210 in a RRC message, a MAC-CE message, or an application layer message. In some cases, C-UE 215 may also transmit the identification information of C-UE 215 to the base station 105.

In some cases, C-UE 215 may determine that the C-UE 215 and V-UE 210 are co-located, based on receiving the identification information of the V-UE 210. C-UE 215 may transmit the identification information to base station 105 in cases where C-UE 215 determines the co-location. In some cases, V-UE 210 may determine that the V-UE 210 and C-UE 215 are co-located, based on receiving the identification information of the C-UE 215. V-UE 210 may transmit the identification information to base station 105 in cases where V-UE 210 determines the co-location.

To determine the co-location, C-UE 215 or V-UE 210 may use a number of different metrics or parameters. The UE may measure a reference signal receive power (RSRP) of the signal transmitted by the other UE. The RSRP measurement may be a one-shot measurement (e.g., in one measurement occasion). The UE may also determine the co-location based on RSRP measurements in multiple measurement occasions. For example if RSRP measurements are constant over multiple occasions, or if one or more RSRP measurements satisfy (e.g., exceed) a threshold, the UE may determine that it is co-located with the other UE.

For example, C-UE 215 may measure the RSRP of one or more received signals from V-UE 210, and C-UE 215 may determine that C-UE 215 is co-located with V-UE 210. In another example, V-UE 210 may measure the RSRP of one or more received signals from C-UE 215, and V-UE 210 may determine that V-UE 210 is co-located with C-UE 215.

Sidelink wireless device 205 may also receive identification information from V-UE 210 including positioning information of V-UE 210. The positioning information of V-UE 210 may include location information, speed information, path information, trajectory information, or a combination of these. Sidelink wireless device 205 may receive the identification information from V-UE 210 in sidelink communications channel 250. Sidelink wireless device 205 may provide the positioning information of V-UE 210 to base station 105.

Base station 105 may then determine that C-UE 215 and V-UE 210 are co-located based on the received identification information of C-UE 215 and V-UE 210. The identification information of C-UE 215 may include a radio network temporary identifier (RNTI), including a cell-RNTI (C-RNTI) or a temporary C-RNTI (TC-RNTI), or a physical cell identifier (PCID) associated with C-UE 215. In some cases, the identification information of C-UE 215 may already be known at base station 105. The identification information of the V-UE 210 may include an application layer identifier, a layer 2 identifier, or a source identifier of V-UE 210. Base station 105 may determine that C-UE 215 and V-UE 210 are co-located based on the report of identification information, and base station 105 may then perform downlink transmission 235 to C-UE 215 based on the positioning information of V-UE 210 received from sidelink wireless device 205. As C-UE 215 and V-UE 210 are co-located, forming transmissions to C-UE 215 based on positioning information of V-UE 210 may match positioning information of C-UE 215, although the positioning information of C-UE 215 may not be directly available.

In some cases, C-UE 215 may also transmit, to base station 105, an indication of a positioning accuracy level of V-UE 210. The positioning accuracy level may indicate whether the positioning information of V-UE 210 is scrambled or coded, which may decrease the accuracy of the positioning information of V-UE 210. In these cases, base station 105 may determine a beam width based on the accuracy level. For example, if the accuracy level satisfies a threshold, the base station 105 may select a narrow beam for communications with C-UE 215, as C-UE 215 may be co-located with V-UE 210, and the base station 105 may use the location information of V-UE 210 for communications with C-UE 215. If the accuracy level does not satisfy a threshold, the base station 105 may select a wider beam for communications with C-UE 215.

Figure 3:
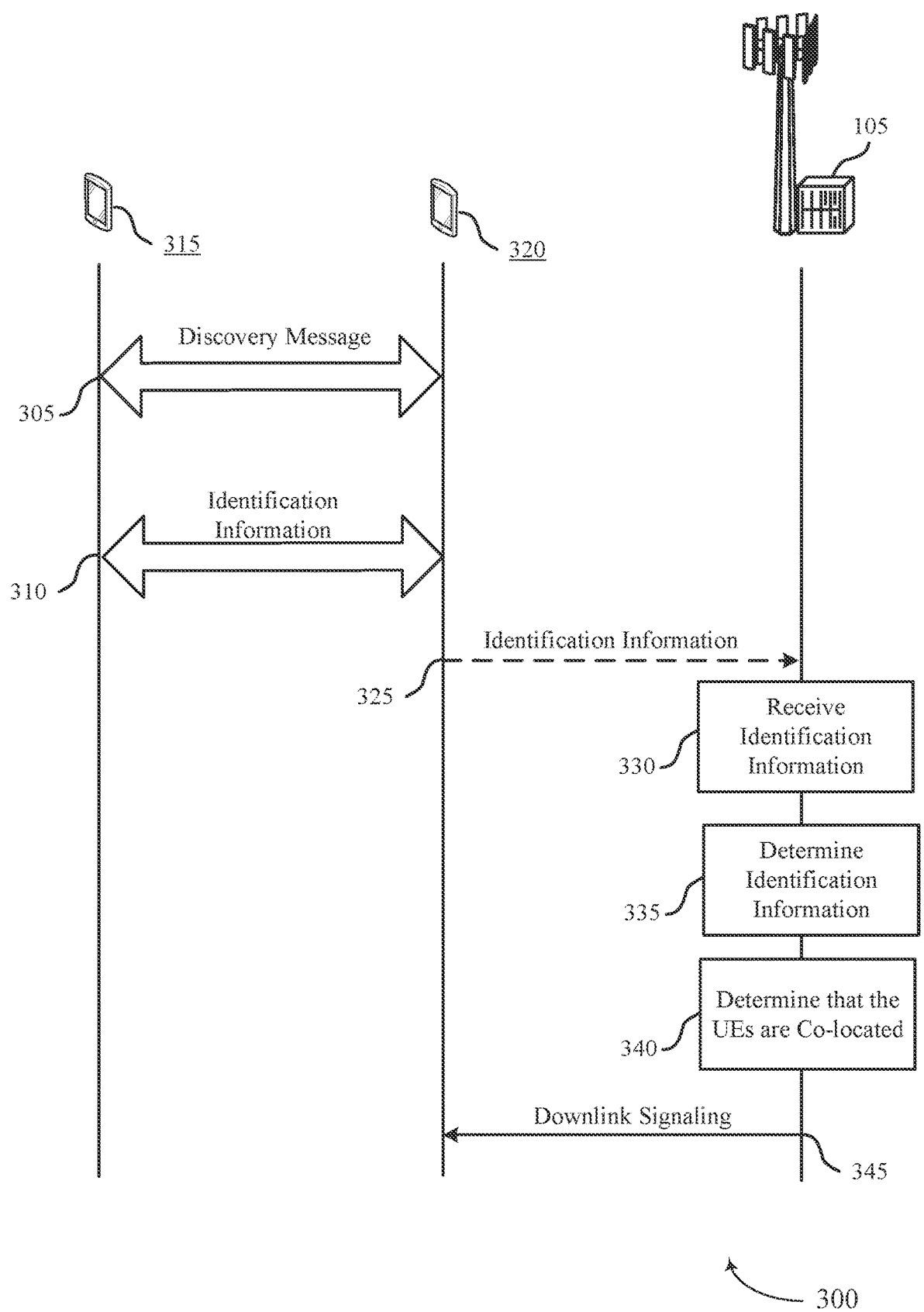
FIG. 3 illustrates an example of a process flow that supports techniques for sidelink assisted device association in accordance with various aspects of the present disclosure.

FIG. 3 illustrates an example of a process flow 300 that supports techniques for sidelink assisted device association in accordance with various aspects of the present disclosure. Process flow 300 includes UE 315 and UE 320, which may be examples of a UE 115, C-UE 215, or V-UE 210 as described with respect to FIGS. 1 and 2. Process flow 300 also includes base station 105, which may be an example of a base station 105 as described with respect to FIGS. 1 and 2. UEs 315 and 320 may be co-located UEs. For example, UE 315 may be a C-UE co-located with UE 320, which may be a V-UE. Alternatively, UE 315 may be a V-UE co-located with UE 320, which may be a C-UE.

At 305, a first UE 315 (e.g., a C-UE or a V-UE) may communicate a discovery query or a discovery request message with a second UE 320 via a sidelink communications link between the first UE and the second UE. The first UE 315 may be either a C-UE or a V-UE, and the second UE may be the other of the V-UE or the C-UE. For example, as described herein, if the first UE 315 is a C-UE, the second UE 320 is a V-UE. Alternatively, the first UE 315 may be a V-UE, and the second UE 320 may be a C-UE.

In one example, first UE 315 may transmit the discovery query message to the second UE 320. First UE 315 may then receive a discovery response from the second UE 320 based on the discovery query message. The discovery response may include identification information of the second UE 320.

In another example, first UE 315 may establish a PC5 connection with the second UE 320. First UE 315 may then receive the identification information of the second UE 320 from the second UE 320.

In another example, first UE 315 may transmit a request for identification information of the second UE 320. The first UE 315 may then receive identification information of the second UE 320, from the second UE 320.

In another example, first UE 315 may receive the discovery request message from the second UE 320, the discovery request message, including identification information of the second UE 320.

At 310, first UE 315 may communicate identification information with the second UE 320 based on communicating the discovery query message or the discovery request message. The identification information of the second UE may include one or more of an application layer identifier, a layer 2 identifier, or a source identifier of the second UE 320. The identification information of the second UE 320 may correspond to one or more of V2X communications, sidelink communications, or PC5 communications. The identification information of the first UE 315 may include a RNTI of UE 315, a cell identifier of a cell associated with the first UE 315, or a combination of these.

At 325, first UE 315 may transmit identification information of the first UE 315, the second UE 320, or both, to base station 105 in an uplink channel transmission. The uplink channel transmission may include a RRC message, an application layer message, or a MAC-CE message. In some cases, first UE 315 may transmit the identification information of the first UE 315, the second UE 320, or both, to a sidelink wireless device in a sidelink channel transmission. The sidelink wireless device and base station 105 may be co-located.

In some examples, other C-UEs may also be near UE 315 or UE 320, and the other C-UEs may also be co-located with UE 315 or UE 320, or both. In these cases, first UE 315 may transmit identification information of the other C-UEs as well.

In some examples, first UE 315 may determine that the first UE 315 and the second UE 320 are co-located, based on the first UE 315 and the second UE 310, sharing a location, or a trajectory, or a combination of these. The first UE 315 may then transmit the identification information of the first UE 315, the second UE, or both, or one or more additional C-UEs, or a combination of these, to the base station 105. Base station 105 may determine that the one or more additional UEs are co-located with the second UE 320 based on the identification information of the one or more additional UEs.

At 330, base station 105 may receive identification information of a first UE 315 in sidelink communication with second UE 320. At 335, base station 105 may determine identification information of the second UE 320. In some cases, base station 105 may receive the identification information of first UE 315 and the second UE 320 from a sidelink wireless device. The sidelink wireless device and the base station 105 may be co-located. The sidelink wireless device may be a RSU. In some cases, base station 105 may receive the identification information of the first UE 315, from the second UE 320, in an uplink channel transmission, via a Uu communications link between the second UE 320 and the base station 105.

In some cases, base station 105 may receive the identification information of the second UE 320 from the second UE 320, in an uplink channel transmission, via a Uu communications link between the second UE 320 and the base station 105. The uplink channel transmission may include a RRC message, an application layer message, or a MAC-CE message.

At 340, base station 105 may determine that first UE 315 and second UE 320 are co-located, based on the identification information of the first UE 315 and the identification information of the second UE 320.

In some examples, first UE 315 may also transmit an indication of a positioning accuracy level, corresponding to identification information of the first UE 315. Base station 105 may receive the indication. Based on receiving the indication, base station 105 may determine a beam width of a downlink beam corresponding to the downlink message, based on the positioning accuracy level.

At 345, first UE 315 may receive downlink signaling from base station 105 according to an association (e.g., a co-location) between first UE 315 and second UE 320. Base station 105 may transmit the downlink message to the first UE 315 based on geographic information of the second UE 320 corresponding to the identification information of the second UE 320. The geographic information may include one or more of location information, speed information, path information, trajectory information, or a combination of these, of the second UE 320. In some cases, base station 105 may receive the geographic information of the second UE 320 from a sidelink wireless device (e.g., a RSU) co-located with the base station 105.

Figure 4:
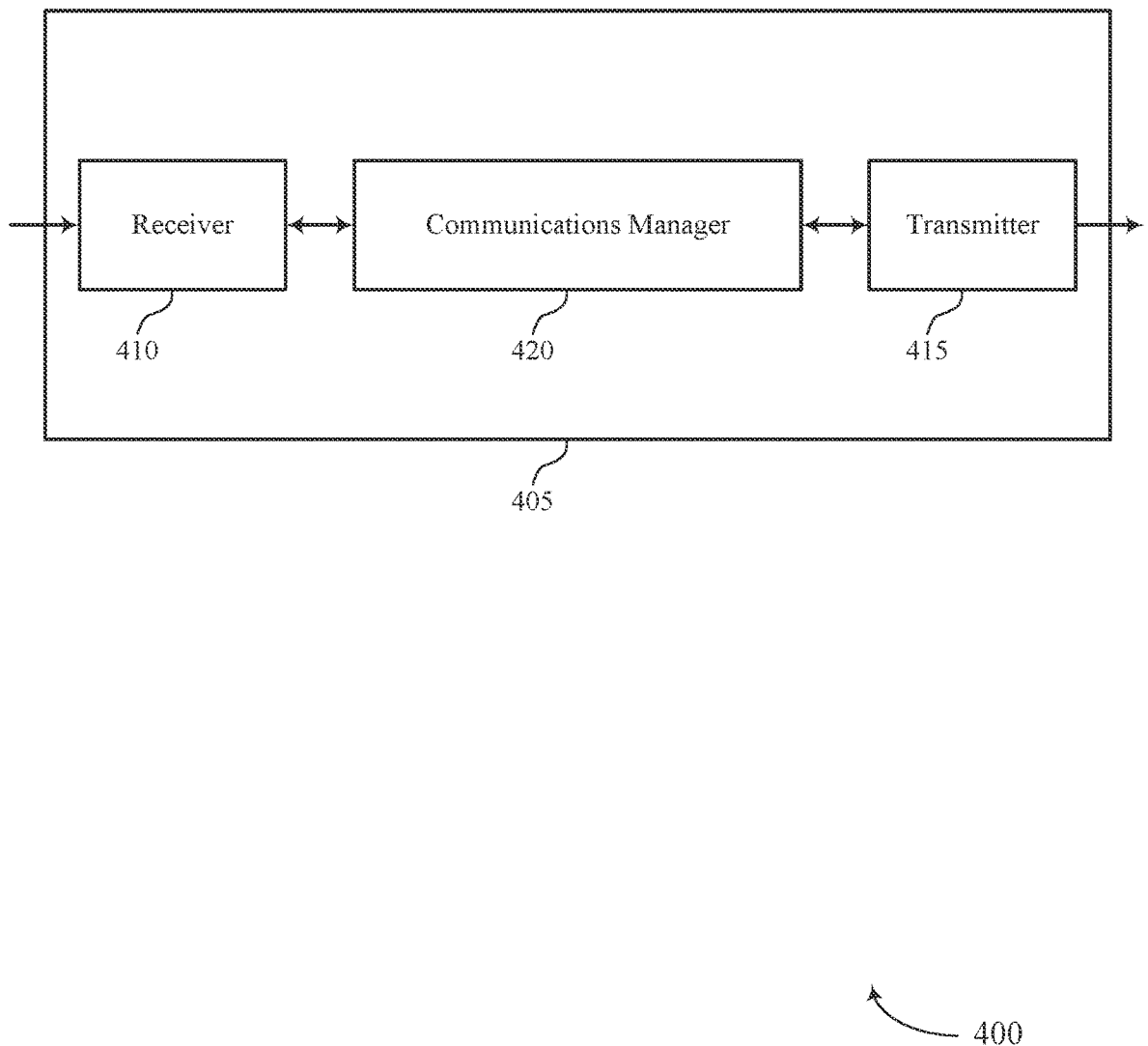
FIGS. 4 and 5 show block diagrams of devices that support techniques for sidelink assisted device association in accordance with various aspects of the present disclosure.

FIG. 4 shows a block diagram 400 of a device 405 that supports techniques for sidelink assisted device association in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for sidelink assisted device association). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for sidelink assisted device association). In some examples, the transmitter 415 may be co-located with a receiver 410 in a transceiver. The transmitter 415 may utilize a single antenna or a set of multiple antennas.

The communications manager 420, the receiver 410, the transmitter 415, or various combinations thereof or various components thereof may be examples of means for performing various aspects of techniques for sidelink assisted device association as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for communicating a discovery query message or a discovery request message with a second UE via a sidelink communications link between the first UE and the second UE. The communications manager 420 may be configured as or otherwise support a means for communicating identification information with the second UE based on communicating the discovery query message or the discovery request message. The communications manager 420 may be configured as or otherwise support a means for receiving downlink signaling from a base station according to an association between the first UE and the second UE based on the identification information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improving communications at the device 405 by aiding in improving location and co-location identification. The device 405 may coordinate with other devices to exchange identification information, including positioning information, which may be indicated to a serving base station 105. The serving base station 105 may then adjust communications to device 405 accordingly, improving efficiency and accuracy of the communications, decreasing the number of retransmission attempts.

Figure 5:
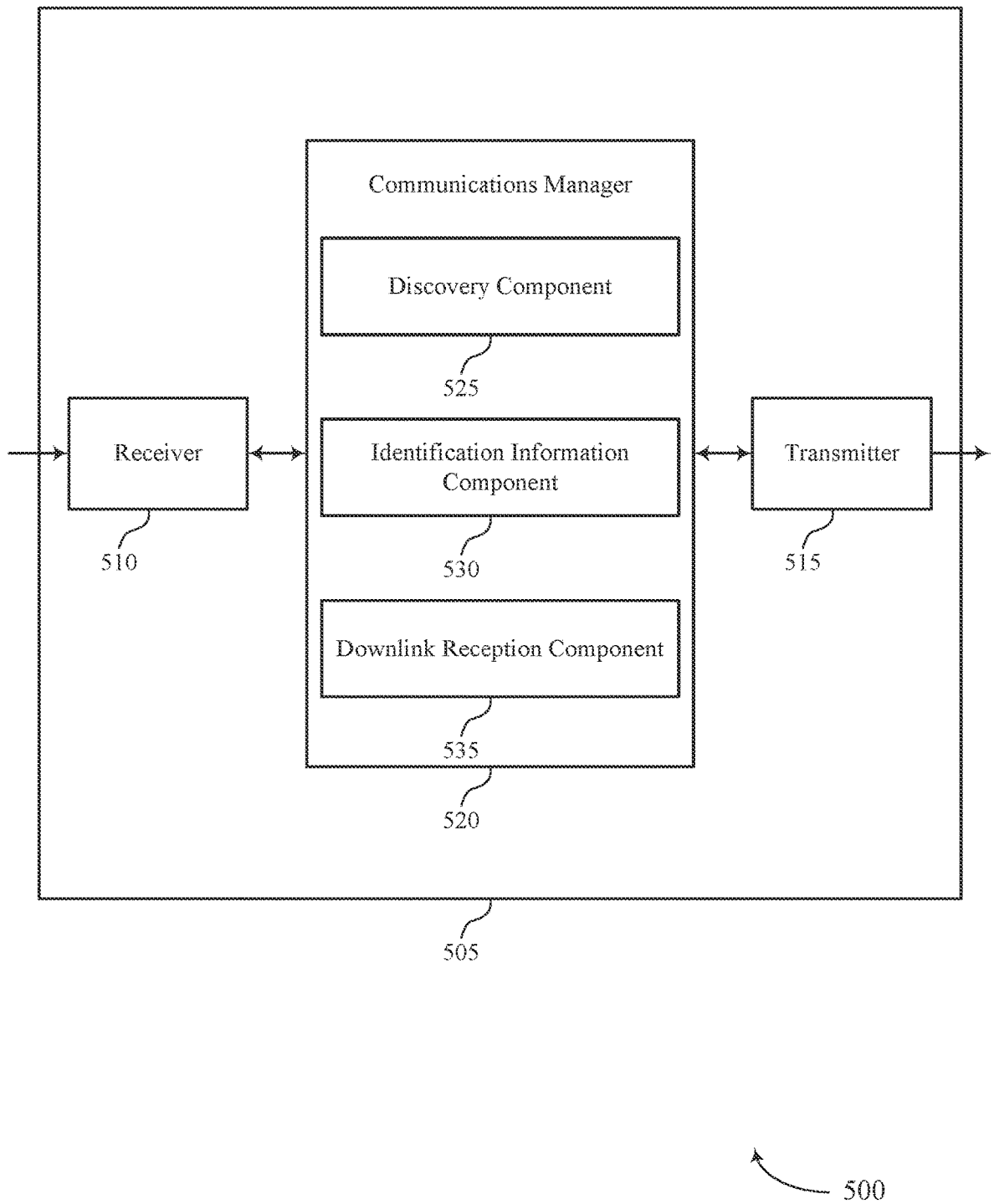

FIG. 5 shows a block diagram 500 of a device 505 that supports techniques for sidelink assisted device association in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink assisted device association). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink assisted device association). In some examples, the transmitter 515 may be co-located with a receiver 510 in a transceiver. The transmitter 515 may utilize a single antenna or a set of multiple antennas.

The device 505, or various components thereof, may be an example of means for performing various aspects of techniques for sidelink assisted device association as described herein. For example, the communications manager 520 may include a discovery component 525, an identification information component 530, a downlink reception component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The discovery component 525 may be configured as or otherwise support a means for communicating a discovery query message or a discovery request message with a second UE via a sidelink communications link between the first UE and the second UE. The identification information component 530 may be configured as or otherwise support a means for communicating identification information with the second UE based on communicating the discovery query message or the discovery request message. The downlink reception component 535 may be configured as or otherwise support a means for receiving downlink signaling from a base station according to an association between the first UE and the second UE based on the identification information.

Figure 6:
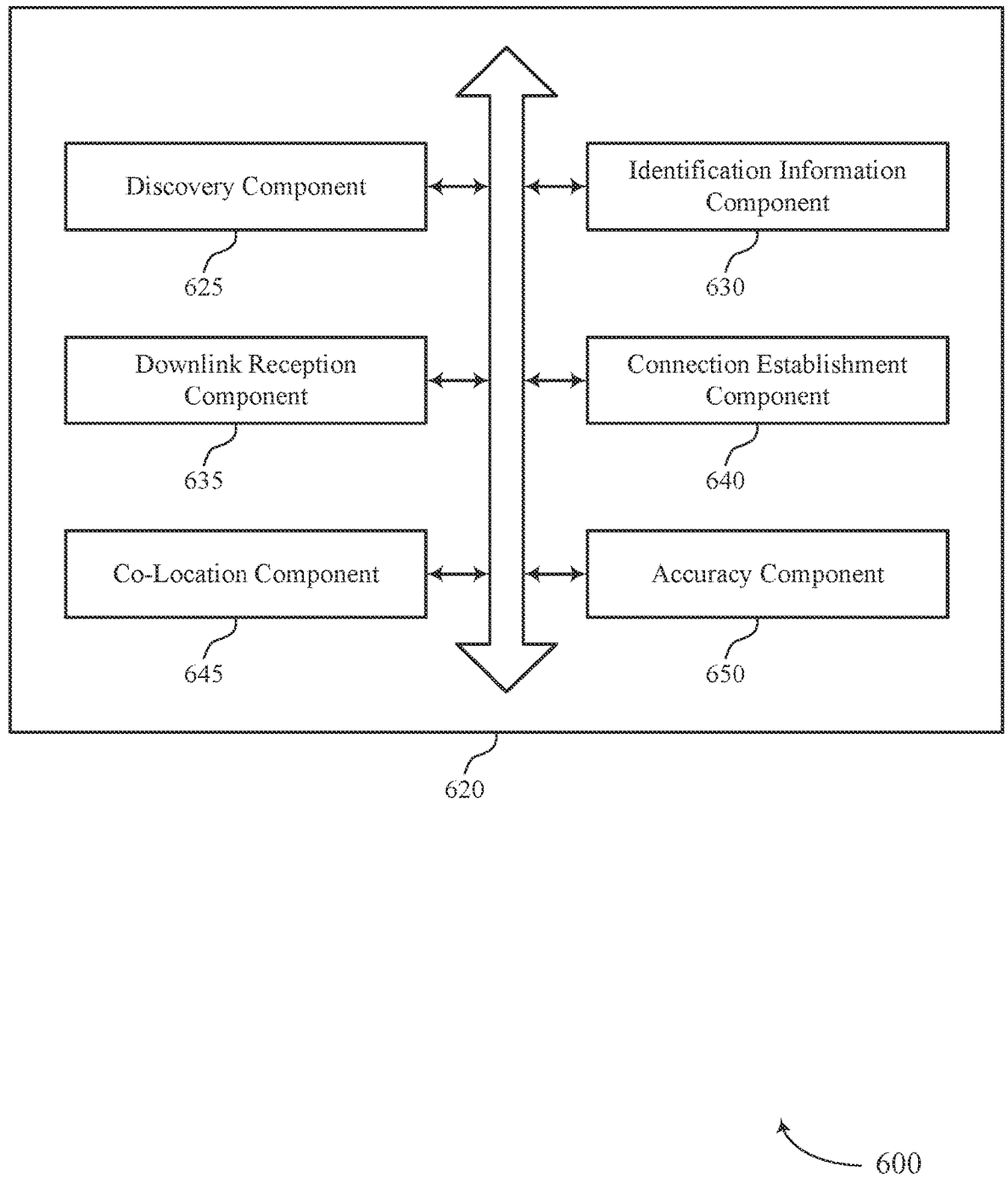
FIG. 6 shows a block diagram of a communications manager that supports techniques for sidelink assisted device association in accordance with various aspects of the present disclosure.

FIG. 6 shows a block diagram 600 of a communications manager 620 that supports techniques for sidelink assisted device association in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for sidelink assisted device association as described herein. For example, the communications manager 620 may include a discovery component 625, an identification information component 630, a downlink reception component 635, a connection establishment component 640, a co-location component 645, an accuracy component 650, or any combination thereof. Each of these components may communicate, directly or indirectly, with one another (e.g., via one or more buses).

The communications manager 620 may support wireless communications at a first UE in accordance with examples as disclosed herein. The discovery component 625 may be configured as or otherwise support a means for communicating a discovery query message or a discovery request message with a second UE via a sidelink communications link between the first UE and the second UE. The identification information component 630 may be configured as or otherwise support a means for communicating identification information with the second UE based on communicating the discovery query message or the discovery request message. The downlink reception component 635 may be configured as or otherwise support a means for receiving downlink signaling from a base station according to an association between the first UE and the second UE based on the identification information.

In some examples, to support communicating the identification information, the identification information component 630 may be configured as or otherwise support a means for transmitting the identification information of the first UE, the second UE, or a combination thereof, to the base station in an uplink channel transmission, where the uplink channel transmission includes a RRC message, an application layer message, or a medium access control channel control element message.

In some examples, to support communicating the identification information, the identification information component 630 may be configured as or otherwise support a means for transmitting the identification information of the UE, the second UE, or a combination thereof, to a sidelink wireless device in a sidelink channel transmission.

In some examples, the sidelink wireless device and the base station are co-located.

In some examples, the discovery component 625 may be configured as or otherwise support a means for transmitting the discovery query message to the second UE. In some examples, the discovery component 625 may be configured as or otherwise support a means for receiving a discovery response from the second UE based at least in part in the discovery query message, where the discovery response includes identification information of the second UE.

In some examples, the connection establishment component 640 may be configured as or otherwise support a means for establishing a PC5 connection with the second UE. In some examples, the identification information component 630 may be configured as or otherwise support a means for receiving the identification information of the second UE from the second UE.

In some examples, the identification information component 630 may be configured as or otherwise support a means for transmitting a request for identification information of the second UE to the second UE. In some examples, the identification information component 630 may be configured as or otherwise support a means for receiving identification information of the second UE from the second UE.

In some examples, the discovery component 625 may be configured as or otherwise support a means for receiving the discovery request message from the second UE, the discovery request message including identification information of the second UE.

In some examples, the identification information of the second UE includes one or more of an application layer identifier, a layer 2 identifier, or a source identifier, or a combination thereof of the second UE. In some examples, the identification information corresponds to one or more of vehicle-to-everything communications, sidelink communications, or PC5 communications.

In some examples, the identification information of the first UE includes a RNTI of the first UE, a cell identifier of a cell associated with the first UE, or a combination thereof.

In some examples, the first UE is one of a cellular UE or a vehicle UE and the second UE is the other of the cellular UE or the vehicle UE.

In some examples, to support communicating the identification information, the identification information component 630 may be configured as or otherwise support a means for transmitting the identification information of the first UE, the second UE, or one or more additional UEs, or a combination thereof, to the base station in an uplink channel transmission, where the one or more additional UEs include cellular UEs.

In some examples, the co-location component 645 may be configured as or otherwise support a means for determining that the first UE and the second UE are co-located based on the first UE and the second UE sharing a location or a trajectory or a combination thereof. In some examples, the identification information component 630 may be configured as or otherwise support a means for transmitting the identification information of the first UE, the second UE, or the one or more additional UEs, or a combination thereof, to the base station based on the determining.

In some examples, the accuracy component 650 may be configured as or otherwise support a means for transmitting an indication of a positioning accuracy level corresponding to identification information of the first UE.

Figure 7:
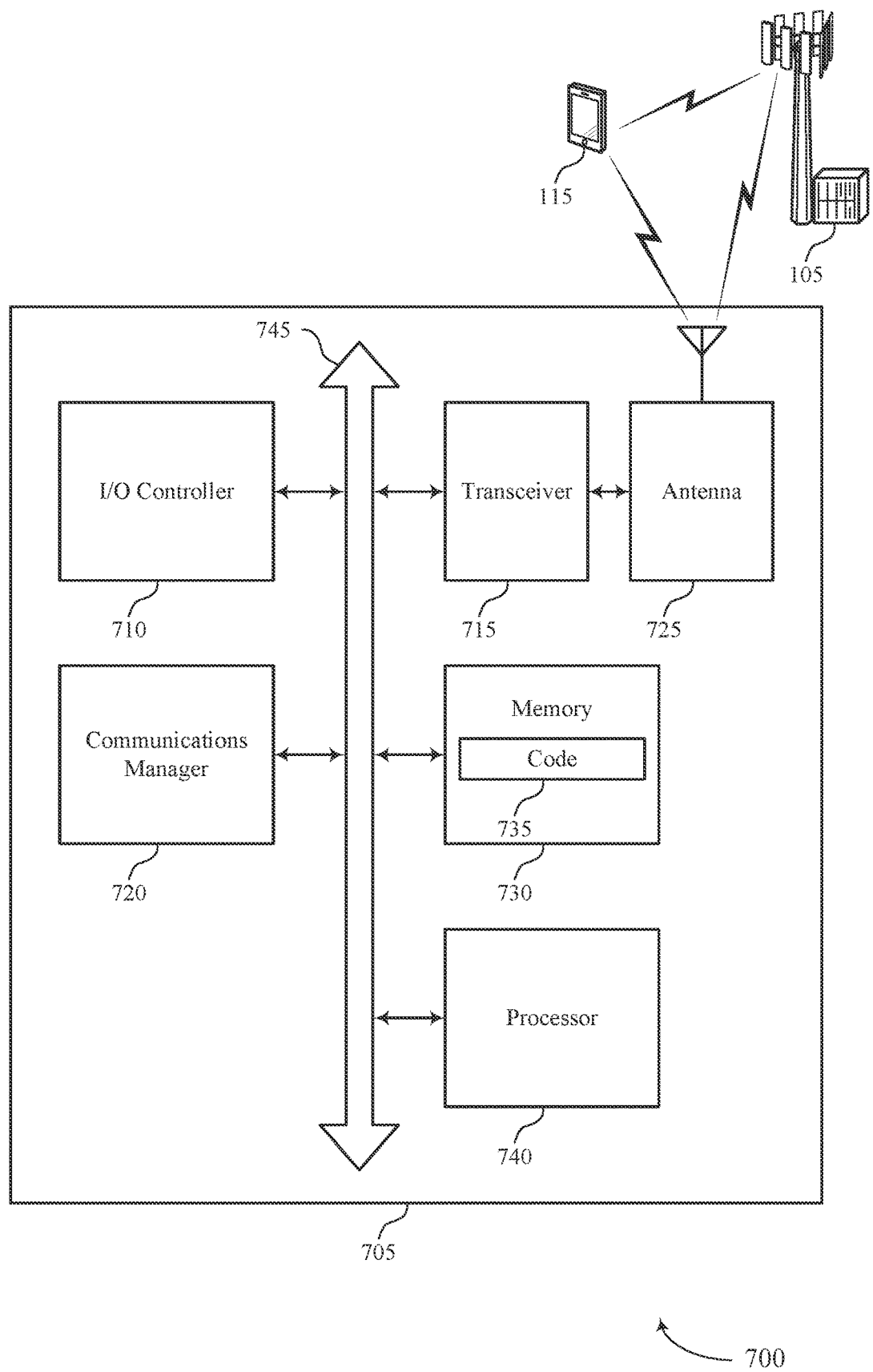
FIG. 7 shows a diagram of a system including a device that supports techniques for sidelink assisted device association in accordance with various aspects of the present disclosure.

FIG. 7 shows a diagram of a system 700 including a device 705 that supports techniques for sidelink assisted device association in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM) The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for sidelink assisted device association). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for communicating a discovery query message or a discovery request message with a second UE via a sidelink communications link between the first UE and the second UE. The communications manager 720 may be configured as or otherwise support a means for communicating identification information with the second UE based on communicating the discovery query message or the discovery request message. The communications manager 720 may be configured as or otherwise support a means for receiving downlink signaling from a base station according to an association between the first UE and the second UE based on the identification information.

By including or configuring the communications manager 720 in accordance with examples as described herein, the device 705 may support techniques improving communications at the device 705 by aiding in improving location and co-location identification. The device 705 may coordinate with other devices to exchange identification information, including positioning information, which may be indicated to a serving base station 105. The serving base station 105 may then adjust communications to device 705 accordingly, improving efficiency and accuracy of the communications, decreasing the number of retransmission attempts.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for sidelink assisted device association as described herein, or the processor 740 and the memory 730 may be otherwise configured to perform or support such operations.

Figure 8:
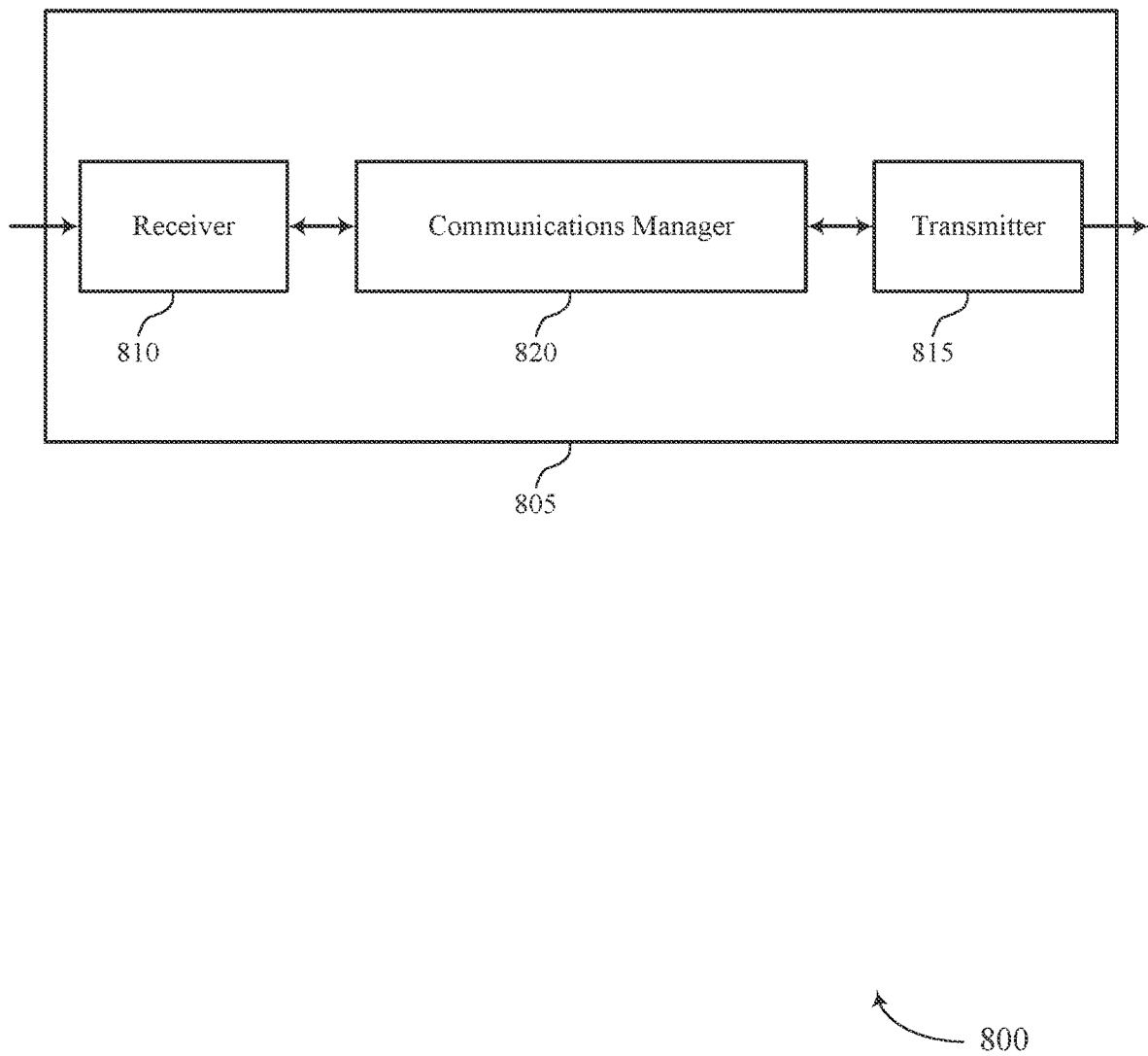
FIGS. 8 and 9 show block diagrams of devices that support techniques for sidelink assisted device association in accordance with various aspects of the present disclosure.

FIG. 8 shows a block diagram 800 of a device 805 that supports techniques for sidelink assisted device association in accordance with various aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for sidelink assisted device association). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for sidelink assisted device association). In some examples, the transmitter 815 may be co-located with a receiver 810 in a transceiver. The transmitter 815 may utilize a single antenna or a set of multiple antennas.

The communications manager 820, the receiver 810, the transmitter 815, or various combinations thereof or various components thereof may be examples of means for performing various aspects of techniques for sidelink assisted device association as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving identification information of a first UE in sidelink communication with a second UE. The communications manager 820 may be configured as or otherwise support a means for determining identification information of the second UE in communication with the base station. The communications manager 820 may be configured as or otherwise support a means for determining that the first UE and the second UE are co-located based on the identification information of the first UE and the identification information of the second UE. The communications manager 820 may be configured as or otherwise support a means for transmitting a downlink message to the second UE based on determining that the first UE and the second UE are co-located.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improving communications with devices served by device 805. Device 805 may receive, via receiver 810, identification and positioning information of other devices, and may alter downlink communications to the devices based on the positioning information. The downlink communications may be altered, which may improve efficiency, in cases where receiving devices are co-located.

Figure 9:
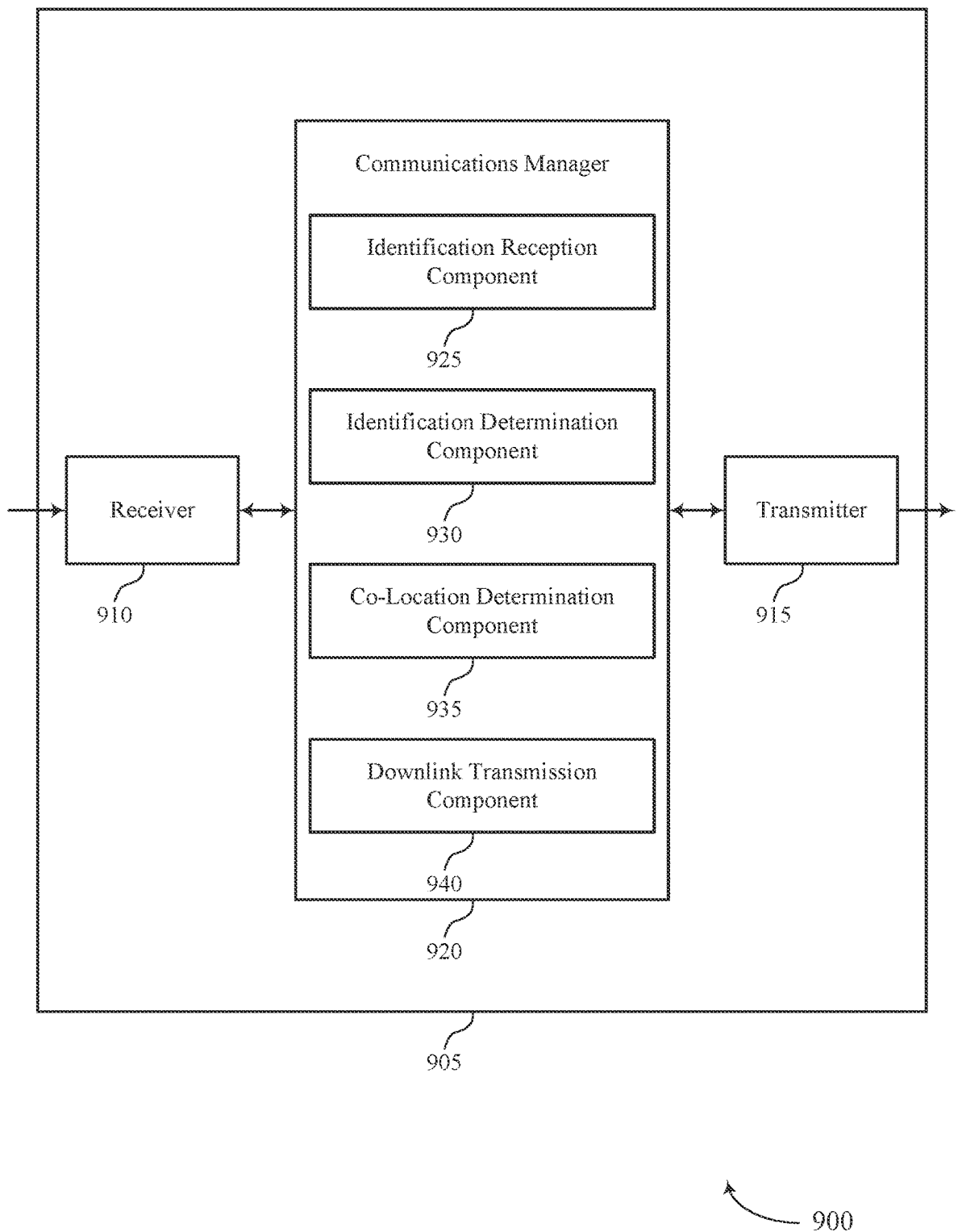

FIG. 9 shows a block diagram 900 of a device 905 that supports techniques for sidelink assisted device association in accordance with various aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for sidelink assisted device association). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for sidelink assisted device association). In some examples, the transmitter 915 may be co-located with a receiver 910 in a transceiver. The transmitter 915 may utilize a single antenna or a set of multiple antennas.

The device 905, or various components thereof, may be an example of means for performing various aspects of techniques for sidelink assisted device association as described herein. For example, the communications manager 920 may include an identification reception component 925, an identification determination component 930, a co-location determination component 935, a downlink transmission component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The identification reception component 925 may be configured as or otherwise support a means for receiving identification information of a first UE in sidelink communication with a second UE. The identification determination component 930 may be configured as or otherwise support a means for determining identification information of the second UE in communication with the base station. The co-location determination component 935 may be configured as or otherwise support a means for determining that the first UE and the second UE are co-located based on the identification information of the first UE and the identification information of the second UE. The downlink transmission component 940 may be configured as or otherwise support a means for transmitting a downlink message to the second UE based on determining that the first UE and the second UE are co-located.

Figure 10:
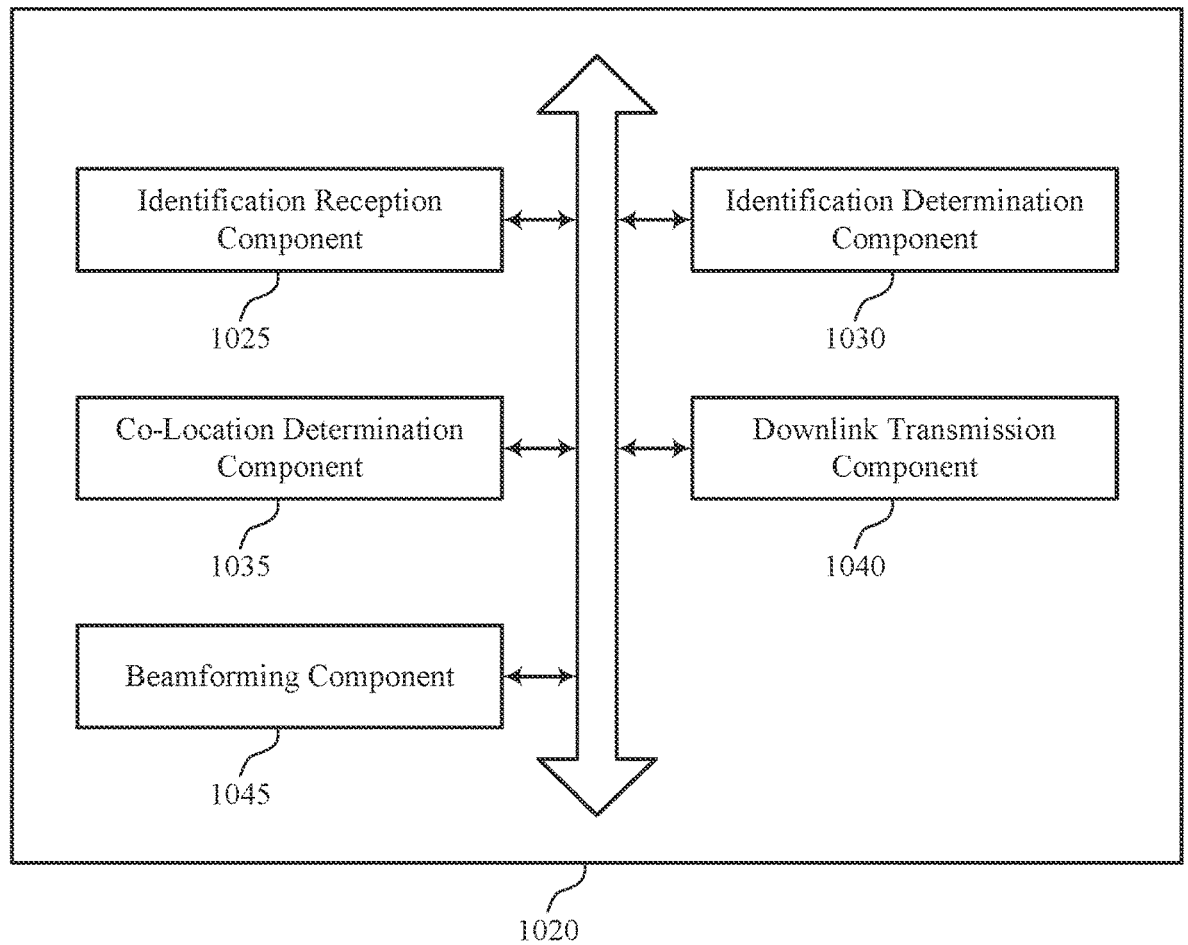
FIG. 10 shows a block diagram of a communications manager that supports techniques for sidelink assisted device association in accordance with various aspects of the present disclosure.

FIG. 10 shows a block diagram 1000 of a communications manager 1020 that supports techniques for sidelink assisted device association in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for sidelink assisted device association as described herein. For example, the communications manager 1020 may include an identification reception component 1025, an identification determination component 1030, a co-location determination component 1035, a downlink transmission component 1040, a beamforming component 1045, or any combination thereof. Each of these components may communicate, directly or indirectly, with one another (e.g., via one or more buses).

The communications manager 1020 may support wireless communications at a base station in accordance with examples as disclosed herein. The identification reception component 1025 may be configured as or otherwise support a means for receiving identification information of a first UE in sidelink communication with a second UE. The identification determination component 1030 may be configured as or otherwise support a means for determining identification information of the second UE in communication with the base station. The co-location determination component 1035 may be configured as or otherwise support a means for determining that the first UE and the second UE are co-located based on the identification information of the first UE and the identification information of the second UE. The downlink transmission component 1040 may be configured as or otherwise support a means for transmitting a downlink message to the second UE based on determining that the first UE and the second UE are co-located.

In some examples, the identification determination component 1030 may be configured as or otherwise support a means for receiving the identification information of the first UE and the second UE from a sidelink wireless device.

In some examples, the sidelink wireless device and the base station are co-located.

In some examples, the identification reception component 1025 may be configured as or otherwise support a means for receiving the identification information of the first UE from the second UE in an uplink channel transmission via a Uu communications link between the second UE and the base station.

In some examples, the uplink channel transmission includes a RRC message, an application layer message, or a medium access control channel control element message.

In some examples, the identification determination component 1030 may be configured as or otherwise support a means for receiving the identification information of the second UE from the second UE in an uplink channel transmission via a Uu communications link between the second UE and the base station.

In some examples, the beamforming component 1045 may be configured as or otherwise support a means for receiving an indication of a positioning accuracy level corresponding to identification information of the first UE.

In some examples, the beamforming component 1045 may be configured as or otherwise support a means for determining a beam width of a downlink beam corresponding to the downlink message based on the positioning accuracy level.

In some examples, the downlink transmission component 1040 may be configured as or otherwise support a means for transmitting the downlink message to the first UE based on geographic information of the second UE corresponding to the identification information of the second UE.

In some examples, the geographic information includes one or more of location information, speed information, path information, trajectory information, or a combination thereof, of the second UE.

In some examples, the identification reception component 1025 may be configured as or otherwise support a means for receiving the geographic information of the second UE from a sidelink wireless device co-located with the base station.

In some examples, the first UE is one of a cellular UE or a vehicle UE and the second UE is the other of the cellular UE or the vehicle UE.

In some examples, the identification information of the first UE includes a RNTI of the first UE, a cell identifier of a cell associated with the first UE, or a combination thereof.

In some examples, the identification information of the second UE includes one or more of an application layer identifier, a layer 2 identifier, or a source identifier, or a combination thereof of the second UE.

In some examples, the identification reception component 1025 may be configured as or otherwise support a means for receiving identification information of the second UE and one or more additional UEs from the first UE co-located with the second UE, where the one or more additional UEs include cellular UEs. In some examples, the identification determination component 1030 may be configured as or otherwise support a means for determining that the one or more additional UEs are co-located with the second UE based on the identification information of the one or more additional UEs.

Figure 11:
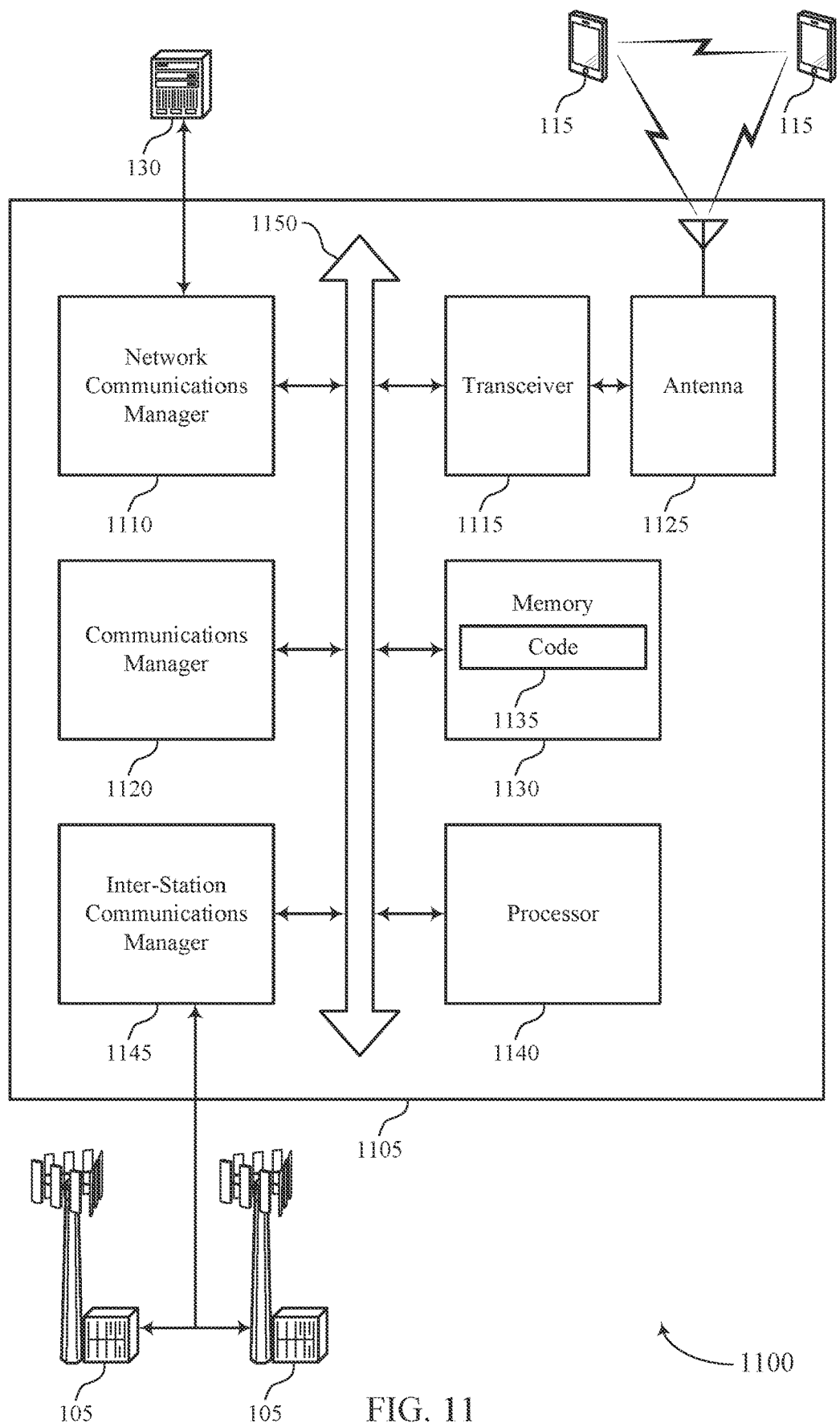
FIG. 11 shows a diagram of a system including a device that supports techniques for sidelink assisted device association in accordance with various aspects of the present disclosure.

FIG. 11 shows a diagram of a system 1100 including a device 1105 that supports techniques for sidelink assisted device association in accordance with various aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for sidelink assisted device association). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving identification information of a first UE in sidelink communication with a second UE. The communications manager 1120 may be configured as or otherwise support a means for determining identification information of the second UE in communication with the base station. The communications manager 1120 may be configured as or otherwise support a means for determining that the first UE and the second UE are co-located based on the identification information of the first UE and the identification information of the second UE. The communications manager 1120 may be configured as or otherwise support a means for transmitting a downlink message to the second UE based on determining that the first UE and the second UE are co-located.

By including or configuring the communications manager 1120 in accordance with examples as described herein, the device 1105 may support techniques for improving communications with devices served by device 1105. Device 1105 may receive identification and positioning information of other devices, including UEs 115, and may alter downlink communications to the devices based on the positioning information. The downlink communications may be altered, which may improve efficiency, in cases where receiving devices are co-located. Communications reliability may also be improved by transmitting communications to devices determined to be co-located, and accuracy of the downlink transmissions may be improved.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for sidelink assisted device association as described herein, or the processor 1140 and the memory 1130 may be otherwise configured to perform or support such operations.

Figure 12:
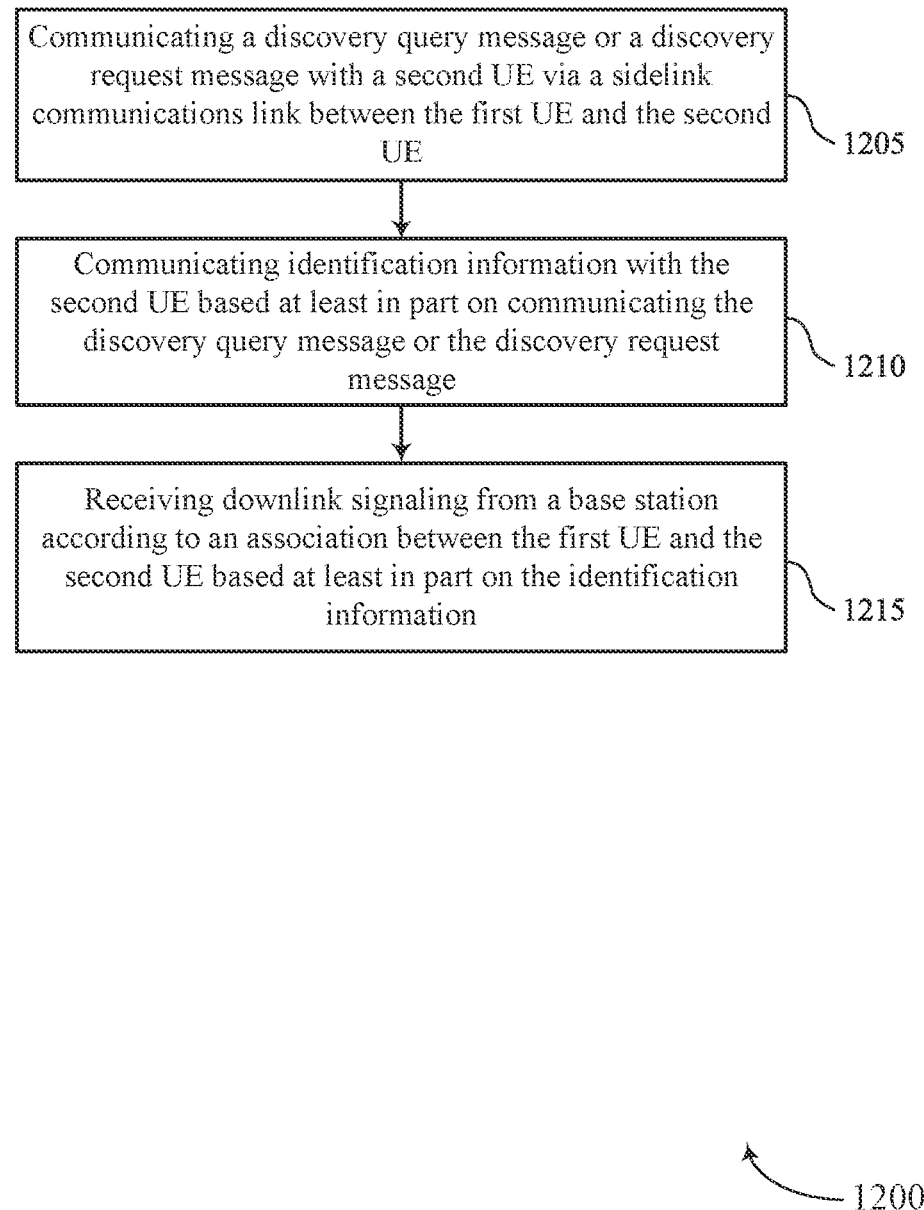
FIGS. 12 through 15 show flowcharts illustrating methods that support techniques for sidelink assisted device association in accordance with various aspects of the present disclosure.

FIG. 12 shows a flowchart illustrating a method 1200 that supports techniques for sidelink assisted device association in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include communicating a discovery query message or a discovery request message with a second UE via a sidelink communications link between the first UE and the second UE. The operations of 1205 may be performed in accordance with examples as disclosed herein. In some examples, aspects of the operations of 1205 may be performed by a discovery component 625 as described with reference to FIG. 6.

At 1210, the method may include communicating identification information with the second UE based on communicating the discovery query message or the discovery request message. The operations of 1210 may be performed in accordance with examples as disclosed herein. In some examples, aspects of the operations of 1210 may be performed by an identification information component 630 as described with reference to FIG. 6.

At 1215, the method may include receiving downlink signaling from a base station according to an association between the first UE and the second UE based on the identification information. The operations of 1215 may be performed in accordance with examples as disclosed herein. In some examples, aspects of the operations of 1215 may be performed by a downlink reception component 635 as described with reference to FIG. 6.

Figure 13:
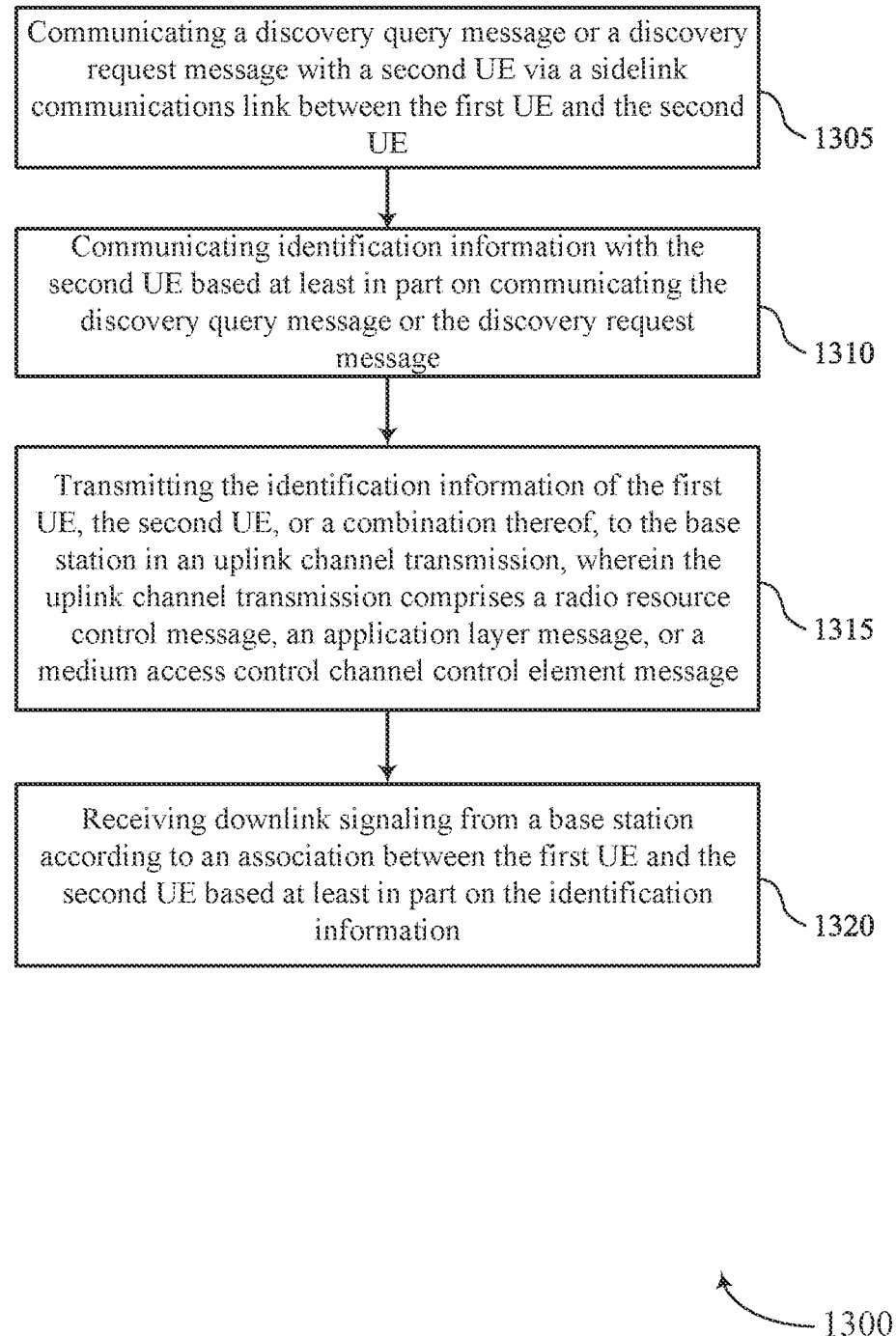

FIG. 13 shows a flowchart illustrating a method 1300 that supports techniques for sidelink assisted device association in accordance with various aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include communicating a discovery query message or a discovery request message with a second UE via a sidelink communications link between the first UE and the second UE. The operations of 1305 may be performed in accordance with examples as disclosed herein. In some examples, aspects of the operations of 1305 may be performed by a discovery component 625 as described with reference to FIG. 6.

At 1310, the method may include communicating identification information with the second UE based on communicating the discovery query message or the discovery request message. The operations of 1310 may be performed in accordance with examples as disclosed herein. In some examples, aspects of the operations of 1310 may be performed by an identification information component 630 as described with reference to FIG. 6.

At 1315, the method may include transmitting the identification information of the first UE, the second UE, or a combination thereof, to the base station in an uplink channel transmission, where the uplink channel transmission includes a RRC message, an application layer message, or a medium access control channel control element message. The operations of 1315 may be performed in accordance with examples as disclosed herein. In some examples, aspects of the operations of 1315 may be performed by an identification information component 630 as described with reference to FIG. 6.

At 1320, the method may include receiving downlink signaling from a base station according to an association between the first UE and the second UE based on the identification information. The operations of 1320 may be performed in accordance with examples as disclosed herein. In some examples, aspects of the operations of 1320 may be performed by a downlink reception component 635 as described with reference to FIG. 6.

Figure 14:
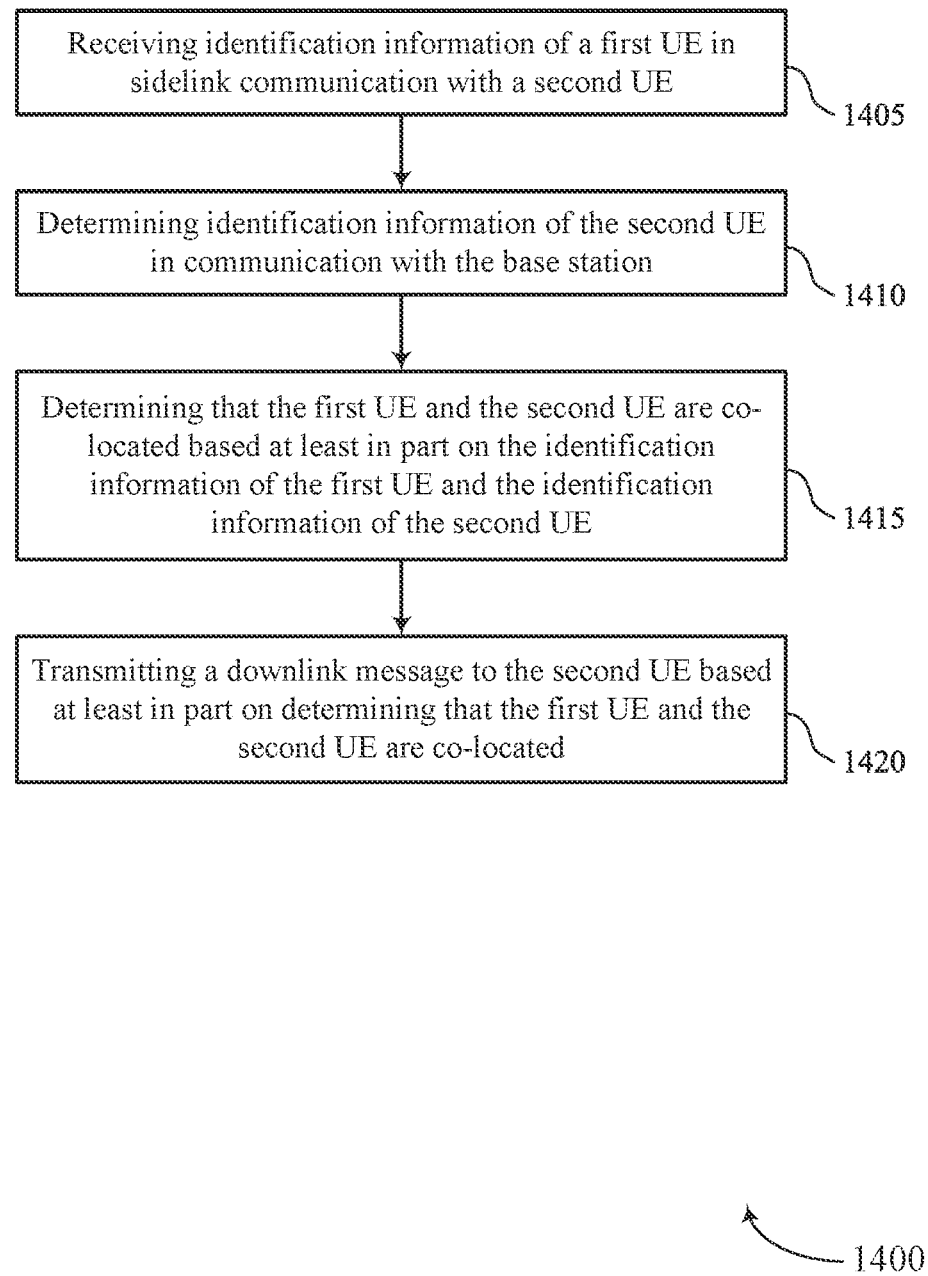

FIG. 14 shows a flowchart illustrating a method 1400 that supports techniques for sidelink assisted device association in accordance with various aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving identification information of a first UE in sidelink communication with a second UE. The operations of 1405 may be performed in accordance with examples as disclosed herein. In some examples, aspects of the operations of 1405 may be performed by an identification reception component 1025 as described with reference to FIG. 10.

At 1410, the method may include determining identification information of the second UE in communication with the base station. The operations of 1410 may be performed in accordance with examples as disclosed herein. In some examples, aspects of the operations of 1410 may be performed by an identification determination component 1030 as described with reference to FIG. 10.

At 1415, the method may include determining that the first UE and the second UE are co-located based on the identification information of the first UE and the identification information of the second UE. The operations of 1415 may be performed in accordance with examples as disclosed herein. In some examples, aspects of the operations of 1415 may be performed by a co-location determination component 1035 as described with reference to FIG. 10.

At 1420, the method may include transmitting a downlink message to the second UE based on determining that the first UE and the second UE are co-located. The operations of 1420 may be performed in accordance with examples as disclosed herein. In some examples, aspects of the operations of 1420 may be performed by a downlink transmission component 1040 as described with reference to FIG. 10.

Figure 15:
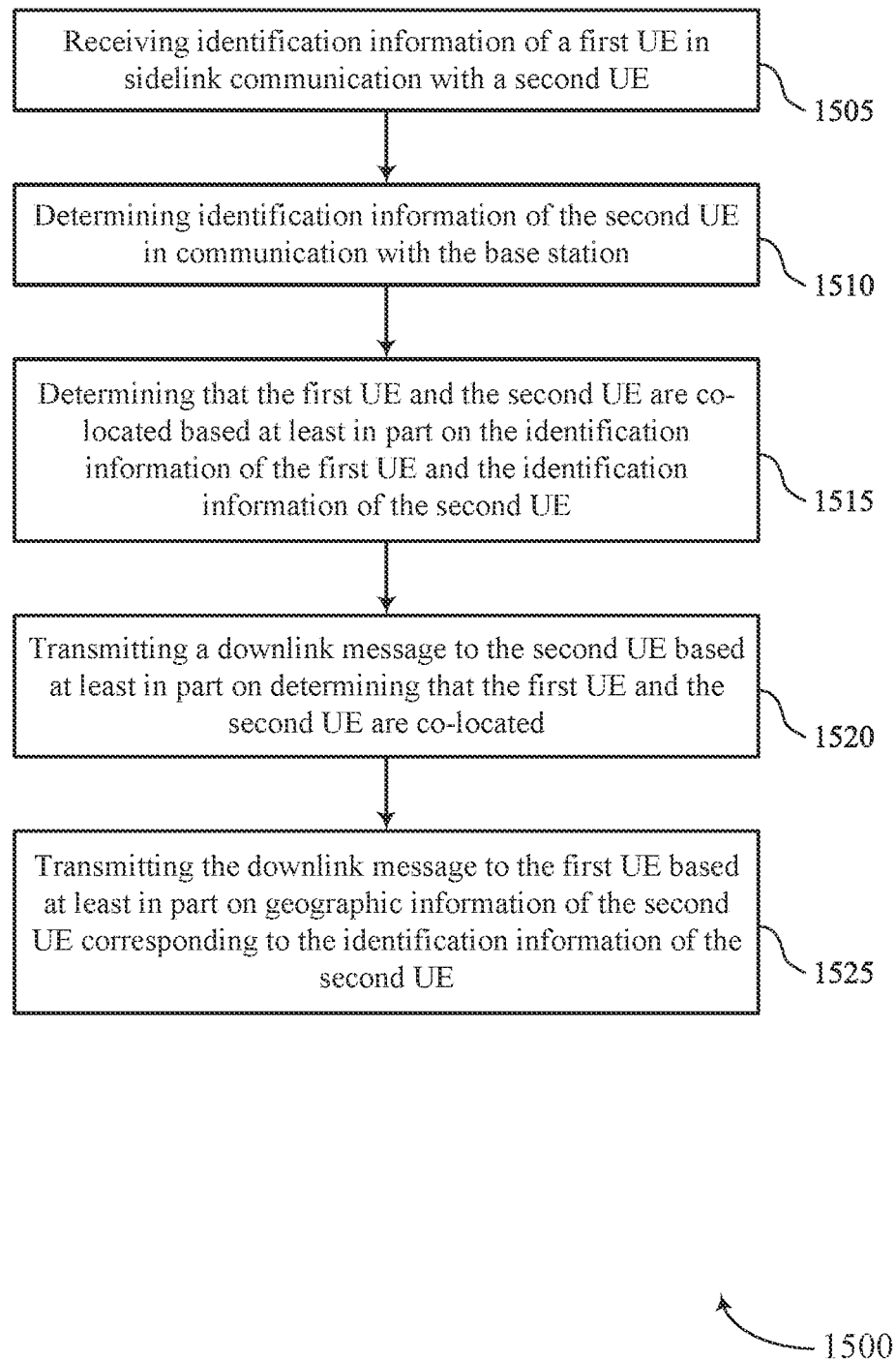

FIG. 15 shows a flowchart illustrating a method 1500 that supports techniques for sidelink assisted device association in accordance with various aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving identification information of a first UE in sidelink communication with a second UE. The operations of 1505 may be performed in accordance with examples as disclosed herein. In some examples, aspects of the operations of 1505 may be performed by an identification reception component 1025 as described with reference to FIG. 10.

At 1510, the method may include determining identification information of the second UE in communication with the base station. The operations of 1510 may be performed in accordance with examples as disclosed herein. In some examples, aspects of the operations of 1510 may be performed by an identification determination component 1030 as described with reference to FIG. 10.

At 1515, the method may include determining that the first UE and the second UE are co-located based on the identification information of the first UE and the identification information of the second UE. The operations of 1515 may be performed in accordance with examples as disclosed herein. In some examples, aspects of the operations of 1515 may be performed by a co-location determination component 1035 as described with reference to FIG. 10.

At 1520, the method may include transmitting a downlink message to the second UE based on determining that the first UE and the second UE are co-located. The operations of 1520 may be performed in accordance with examples as disclosed herein. In some examples, aspects of the operations of 1520 may be performed by a downlink transmission component 1040 as described with reference to FIG. 10.

At 1525, the method may include transmitting the downlink message to the first UE based on geographic information of the second UE corresponding to the identification information of the second UE. The operations of 1525 may be performed in accordance with examples as disclosed herein. In some examples, aspects of the operations of 1525 may be performed by a downlink transmission component 1040 as described with reference to FIG. 10.

The following provides an overview of aspects of the present disclosure:

Aspect 1: A method for wireless communications at a first UE, comprising: communicating a discovery query message or a discovery request message with a second UE via a sidelink communications link between the first UE and the second UE; communicating identification information with the second UE based at least in part on communicating the discovery query message or the discovery request message; and receiving downlink signaling from a base station according to an association between the first UE and the second UE based at least in part on the identification information.

Aspect 2: The method of aspect 1, wherein communicating the identification information comprises: transmitting the identification information of the first UE, the second UE, or a combination thereof, to the base station in an uplink channel transmission, wherein the uplink channel transmission comprises a RRC message, an application layer message, or a medium access control channel control element message.

Aspect 3: The method of aspect 2, wherein communicating the identification information comprises: transmitting the identification information of the UE, the second UE, or a combination thereof, to a sidelink wireless device in a sidelink channel transmission.

Aspect 4: The method of aspect 3, wherein the sidelink wireless device and the base station are co-located.

Aspect 5: The method of any of aspects 1 through 4, further comprising: transmitting the discovery query message to the second UE; and receiving a discovery response from the second UE based at least in part in the discovery query message, wherein the discovery response comprises identification information of the second UE.

Aspect 6: The method of any of aspects 1 through 5, further comprising: establishing a PC5 connection with the second UE; and receiving the identification information of the second UE from the second UE.

Aspect 7: The method of any of aspects 1 through 6, further comprising: transmitting a request for identification information of the second UE to the second UE; and receiving identification information of the second UE from the second UE.

Aspect 8: The method of any of aspects 1 through 7, further comprising: receiving the discovery request message from the second UE, the discovery request message comprising identification information of the second UE.

Aspect 9: The method of any of aspects 1 through 8, wherein the identification information of the second UE comprises one or more of an application layer identifier, a layer 2 identifier, or a source identifier, or a combination thereof of the second UE, the identification information corresponds to one or more of vehicle-to-everything communications, sidelink communications, or PC5 communications.

Aspect 10: The method of any of aspects 1 through 9, wherein the identification information of the first UE comprises a RNTI of the first UE, a cell identifier of a cell associated with the first UE, or a combination thereof.

Aspect 11: The method of any of aspects 1 through 10, wherein the first UE is one of a cellular UE or a vehicle UE and the second UE is the other of the cellular UE or the vehicle UE.

Aspect 12: The method of any of aspects 1 through 11, wherein communicating the identification information comprises: transmitting the identification information of the first UE, the second UE, or one or more additional UEs, or a combination thereof, to the base station in an uplink channel transmission, wherein the one or more additional UEs comprise cellular UEs.

Aspect 13: The method of aspect 12, further comprising: determining that the first UE and the second UE are co-located based at least in part on the first UE and the second UE sharing a location or a trajectory or a combination thereof; and transmitting the identification information of the first UE, the second UE, or the one or more additional UEs, or a combination thereof, to the base station based at least in part on the determining.

Aspect 14: The method of any of aspects 12 through 13, further comprising: transmitting an indication of a positioning accuracy level corresponding to identification information of the first UE.

Aspect 15: A method for wireless communications at a base station, comprising: receiving identification information of a first UE in sidelink communication with a second UE: determining identification information of the second UE in communication with the base station; determining that the first UE and the second UE are co-located based at least in part on the identification information of the first UE and the identification information of the second UE; and transmitting a downlink message to the second UE based at least in part on determining that the first UE and the second UE are co-located.

Aspect 16: The method of aspect 15, further comprising: receiving the identification information of the first UE and the second UE from a sidelink wireless device.

Aspect 17: The method of aspect 16, wherein the sidelink wireless device and the base station are co-located.

Aspect 18: The method of any of aspects 15 through 17, further comprising: receiving the identification information of the first UE from the second UE in an uplink channel transmission via a Uu communications link between the second UE and the base station.

Aspect 19: The method of aspect 18, wherein the uplink channel transmission comprises a RRC message, an application layer message, or a medium access control channel control element message.

Aspect 20: The method of any of aspects 15 through 19, further comprising: receiving the identification information of the second UE from the second UE in an uplink channel transmission via a Uu communications link between the second UE and the base station.

Aspect 21: The method of aspect 20, further comprising: receiving an indication of a positioning accuracy level corresponding to identification information of the first UE.

Aspect 22: The method of aspect 21; further comprising: determining a beam width of a downlink beam corresponding to the downlink message based at least in part on the positioning accuracy level.

Aspect 23: The method of any of aspects 15 through 22, further comprising: transmitting the downlink message to the first UE based at least in part on geographic information of the second UE corresponding to the identification information of the second UE.

Aspect 24: The method of aspect 23, wherein the geographic information comprises one or more of location information, speed information, path information, trajectory information, or a combination thereof, of the second UE.

Aspect 25: The method of any of aspects 23 through 24, further comprising: receiving the geographic information of the second UE from a sidelink wireless device co-located with the base station.

Aspect 26: The method of any of aspects 15 through 25, wherein the first UE is one of a cellular UE or a vehicle UE and the second UE is the other of the cellular UE or the vehicle UE.

Aspect 27: The method of any of aspects 15 through 26, wherein the identification information of the first UE comprises a RNTI of the first UE, a cell identifier of a cell associated with the first UE, or a combination thereof.

Aspect 28: The method of any of aspects 15 through 27, wherein the identification information of the second UE comprises one or more of an application layer identifier, a layer 2 identifier, or a source identifier, or a combination thereof of the second UE.

Aspect 29: The method of any of aspects 15 through 28, further comprising: receiving identification information of the second UE and one or more additional UEs from the first UE co-located with the second UE, wherein the one or more additional UEs comprise cellular UEs; and determining that the one or more additional UEs are co-located with the second UE based at least in part on the identification information of the one or more additional UEs.

Aspect 30: An apparatus for wireless communications at a first UE, comprising a processor; memory coupled with the processor; and instructions stored in the memory and executable by the processor to cause the apparatus to perform a method of any of aspects 1 through 14.

Aspect 31: An apparatus for wireless communications at a first UE, comprising at least one means for performing a method of any of aspects 1 through 14.

Aspect 32: A non-transitory computer-readable medium storing code for wireless communications at a first UE, the code comprising instructions executable by a processor to perform a method of any of aspects 1 through 14.

Aspect 33: An apparatus for wireless communications at a base station, comprising a processor; memory coupled with the processor; and instructions stored in the memory and executable by the processor to cause the apparatus to perform a method of any of aspects 15 through 29.

Aspect 34: An apparatus for wireless communications at a base station, comprising at least one means for performing a method of any of aspects 15 through 29.

Aspect 35: A non-transitory computer-readable medium storing code for wireless communications at a base station, the code comprising instructions executable by a processor to perform a method of any of aspects 15 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first UE, comprising:
    transmitting a discovery query message to a second UE via a sidelink communications link between the first UE and the second UE, wherein the first UE is a vehicle UE and the second UE is a cellular UE;
    receiving, from the second UE and based at least in part on transmitting the discovery query message, a discovery response comprising identification information of the second UE;
    transmitting the identification information, second identification information of the first UE, or a combination thereof, to a sidelink wireless device in a sidelink channel transmission, wherein the sidelink wireless device and the network entity are co-located; and
    receiving downlink signaling from a network entity according to an association between the first UE and the second UE, wherein the association is based at least in part on the identification information and one or more reference signal measurements associated with the second UE.

2. The method of claim 1, further comprising:
    transmitting the identification information, second identification information of the first UE, or a combination thereof, to the network entity in an uplink channel transmission, wherein the uplink channel transmission comprises a radio resource control message, an application layer message, or a medium access control channel control element message.

3. The method of claim 1, further comprising:
    establishing a PC5 connection with the second UE, wherein the discovery response comprising the identification information is received based at least in part on the establishing.

4. The method of claim 1, wherein the discovery query message comprises a request for the identification information.

5. The method of claim 1, further comprising:
    receiving a discovery request message from the second UE, the discovery request message comprising the identification information.

6. The method of claim 1, wherein:
    the identification information comprises one or more of an application layer identifier, a layer 2 identifier, a source identifier, or a combination thereof of the second UE; and
    the identification information corresponds to one or more of vehicle-to-everything communications, sidelink communications, or PC5 communications.

7. The method of claim 1, wherein the identification information comprises a radio network temporary identifier of the second UE, a cell identifier of a cell associated with the second UE, or a combination thereof.

8. The method of claim 1, further comprising:
    transmitting the identification information, second identification information of the first UE, third identification information of one or more additional UEs, or a combination thereof, to the network entity in an uplink channel transmission, wherein the one or more additional UEs comprise cellular UEs.

9. The method of claim 8, wherein transmitting the identification information, the second identification information of the first UE, the third identification information of the one or more additional UEs, or a combination thereof, comprises:
    transmitting the identification information, the second identification information of the first UE, the third identification information of the one or more additional UEs, or a combination thereof, based at least in part on the first UE and the second UE sharing a location, a trajectory, or a combination thereof.

10. The method of claim 8, further comprising:
    transmitting an indication of a positioning accuracy level corresponding to the second identification information of the first UE.

11. A method for wireless communications at a network entity, comprising:
    receiving, from a second user equipment (UE) in communication with the network entity, first identification information of a first UE in sidelink communication with the second UE and second identification information of the second UE, wherein the first UE is a vehicle UE and the second UE is a cellular UE;
    determining that the first UE and the second UE are co-located based at least in part on the first identification information of the first UE and the second identification information of the second UE and on one or more reference signal measurements associated with the second UE;
    receiving the first identification information of the first UE and the second identification information of the second UE from a sidelink wireless device, wherein the sidelink wireless device and the network entity are co-located; and
    transmitting downlink signaling to the first UE based at least in part on determining that the first UE and the second UE are co-located.

12. The method of claim 11, wherein receiving the first identification information comprises:
    receiving the first identification information of the first UE from the second UE in an uplink channel transmission via a Uu communications link between the second UE and the network entity.

13. The method of claim 11, further comprising:
receiving the second identification information of the second UE from the second UE in an uplink channel transmission via a Uu communications link between the second UE and the network entity.

14. The method of claim 13, further comprising:
receiving an indication of a positioning accuracy level corresponding to the first identification information of the first UE.

15. The method of claim 14, further comprising:
determining a beam width of a downlink beam corresponding to the downlink signaling based at least in part on the positioning accuracy level.

16. The method of claim 11, further comprising:
transmitting the downlink signaling to the first UE based at least in part on geographic information of the second UE corresponding to the second identification information of the second UE.

17. The method of claim 16, wherein the geographic information comprises one or more of location information, speed information, path information, trajectory information, or a combination thereof, of the second UE.

18. The method of claim 16, further comprising:
receiving the geographic information of the second UE from a sidelink wireless device co-located with the network entity.

19. The method of claim 11, wherein the second identification information of the second UE comprises a radio network temporary identifier of the second UE, a cell identifier of a cell associated with the second UE, or a combination thereof.

20. The method of claim 11, wherein the second identification information of the second UE comprises one or more of an application layer identifier, a layer 2 identifier, a source identifier, or a combination thereof of the second UE.

21. The method of claim 11, further comprising:
receiving third identification information of one or more additional UEs from the first UE co-located with the second UE, wherein the one or more additional UEs comprise cellular UEs; and
determining that the one or more additional UEs are co-located with the second UE based at least in part on the third identification information of the one or more additional UEs.

22. An apparatus for wireless communication at a first user equipment (UE), comprising:
a processor;
memory coupled with the processor; and
instructions stored in the memory and executable by the processor to cause the apparatus to:
transmit a discovery query message to a second UE via a sidelink communications link between the first UE and the second UE, wherein the first UE is a vehicle UE and the second UE is a cellular UE;
receive, from the second UE and based at least in part on transmitting the discovery query message, a discovery response comprising identification information of the second UE;
transmit the identification information, second identification information of the first UE, or a combination thereof, to a sidelink wireless device in a sidelink channel transmission, wherein the sidelink wireless device and the network entity are co-located; and
receive downlink signaling from a network entity according to an association between the first UE and the second UE, wherein the association is based at least in part on the identification information and one or more reference signal measurements associated with the second UE.

23. An apparatus for wireless communication at a network entity, comprising:
a processor;
memory coupled with the processor; and
instructions stored in the memory and executable by the processor to cause the apparatus to:
receive, from a second user equipment (UE) in communication with the network entity, first identification information of a first UE in sidelink communication with the second UE and second identification information of the second UE, wherein the first UE is a vehicle UE and the second UE is a cellular UE;
determine that the first UE and the second UE are co-located based at least in part on the first identification information of the first UE and the second identification information of the second UE and on one or more reference signal measurements associated with the second UE;
receive the first identification information of the first UE and the second identification information of the second UE from a sidelink wireless device, wherein the sidelink wireless device and the network entity are co-located; and
transmit downlink signaling to the first UE based at least in part on determining that the first UE and the second UE are co-located.

* * * * *